United States Patent
Shibutani et al.

(10) Patent No.: US 9,779,568 B2
(45) Date of Patent: Oct. 3, 2017

(54) LOCKING CONTROL DEVICE, LOCKING CONTROL SYSTEM, AND LOCKING CONTROL METHOD

(71) Applicant: NTT DOCOMO, INC., Chiyoda-ku (JP)

(72) Inventors: Akira Shibutani, Chiyoda-ku (JP); Shigeko Kobayashi, Chiyoda-ku (JP); Kazuma Nachi, Chiyoda-ku (JP); Yuuta Higuchi, Chiyoda-ku (JP); Tetsuhiro Sasagawa, Chiyoda-ku (JP); Tetsuhiro Tanno, Chiyoda-ku (JP); Yuusaku Inoue, Chiyoda-ku (JP); Kunio Yoshikawa, Chiyoda-ku (JP); Takashi Okada, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 15/126,193

(22) PCT Filed: Feb. 18, 2015

(86) PCT No.: PCT/JP2015/054438
§ 371 (c)(1),
(2) Date: Sep. 14, 2016

(87) PCT Pub. No.: WO2015/156035
PCT Pub. Date: Oct. 15, 2015

(65) Prior Publication Data
US 2017/0084100 A1    Mar. 23, 2017

(30) Foreign Application Priority Data
Apr. 11, 2014    (JP) .................................. 2014-081960

(51) Int. Cl.
*G07C 9/00* (2006.01)
*E05B 49/00* (2006.01)
(Continued)

(52) U.S. Cl.
CPC .......... *G07C 9/00309* (2013.01); *E05B 47/00* (2013.01); *E05B 49/00* (2013.01);
(Continued)

(58) Field of Classification Search
CPC ............ G07C 9/00309; G07C 9/00103; G07C 9/00571
(Continued)

(56) References Cited

U.S. PATENT DOCUMENTS

2011/0311052 A1    12/2011  Myers et al.
2014/0201517 A1     7/2014  Corrion
(Continued)

FOREIGN PATENT DOCUMENTS

EP    2 672 464 A1    12/2013
GB    2 372 126 A      8/2002
(Continued)

OTHER PUBLICATIONS

International Search Report dated May 12, 2015 in PCT/JP15/054438 Filed Feb. 18, 2015.
(Continued)

*Primary Examiner* — Allen T Cao
(74) *Attorney, Agent, or Firm* — Oblon, McClelland, Maier & Neustadt, L.L.P.

(57) ABSTRACT

In a coin-operated locker, a short-range wireless communication unit receives UIM information, which is information for connection to a mobile communication network, from a wearable device by short-range wireless communication. A server communication unit communicates with an authentication server that holds authentication-relevant information
(Continued)

by mobile communication using the UIM information. The server communication unit receives authentication information from the authentication server. An authentication unit performs authentication using the authentication information received from the authentication server and a locking control unit performs locking control on the basis of the authentication result from the authentication unit.

8 Claims, 9 Drawing Sheets

(51) Int. Cl.
*H04M 1/00* (2006.01)
*H04W 4/00* (2009.01)
*E05B 47/00* (2006.01)
*E05B 65/02* (2006.01)

(52) U.S. Cl.
CPC ........ *E05B 65/025* (2013.01); *G07C 9/00103* (2013.01); *G07C 9/00571* (2013.01); *H04M 1/00* (2013.01); *H04W 4/00* (2013.01); *G07C 2009/00349* (2013.01); *G07C 2009/00769* (2013.01)

(58) Field of Classification Search
USPC .................................................. 340/5.6–5.65
See application file for complete search history.

(56) References Cited

U.S. PATENT DOCUMENTS

2016/0019735 A1   1/2016  Myers et al.
2017/0193314 A1*  7/2017  Kim ................... G06K 9/00885

FOREIGN PATENT DOCUMENTS

JP      2001-285957 A    10/2001
WO    WO 2013/100905 A1  7/2013

OTHER PUBLICATIONS

English translation of the International Preliminary Report on Patentability and Written Opinion dated Oct. 20, 2016 in PCT/JP2015/054438 filed Feb. 18, 2015.
Extended European Search Report dated Mar. 15, 2017 in Patent Application No. 15777410.0.

* cited by examiner

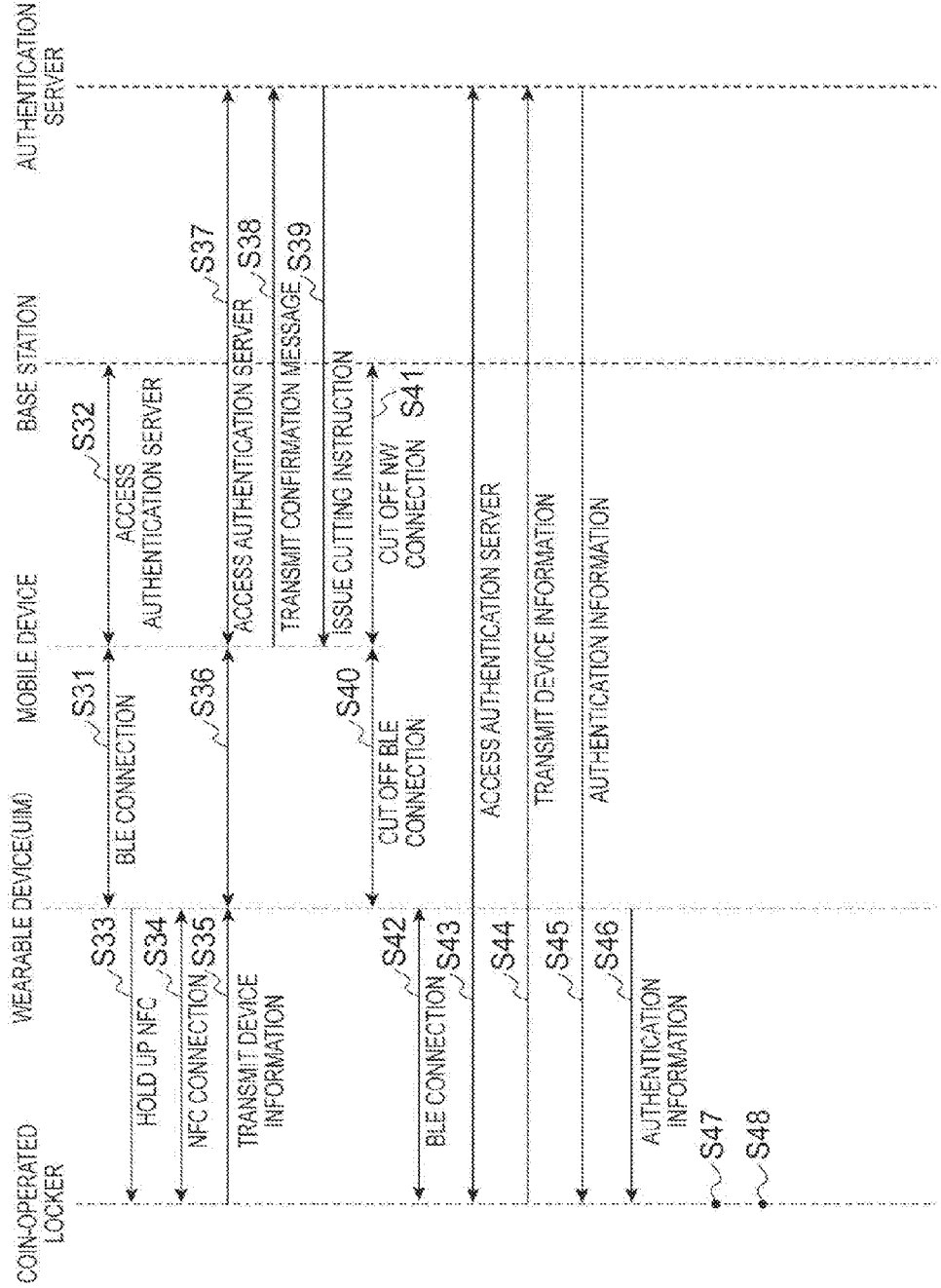

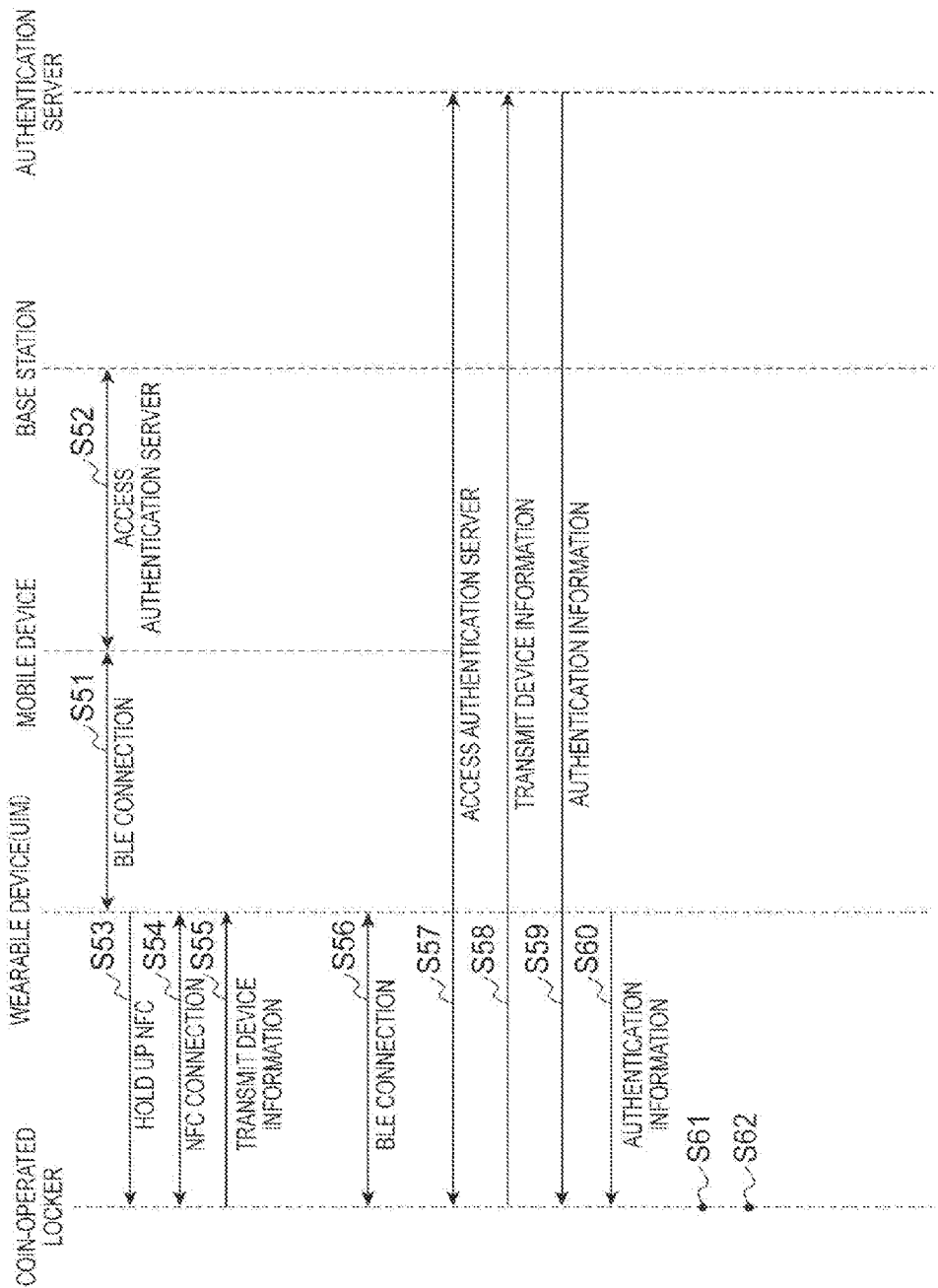

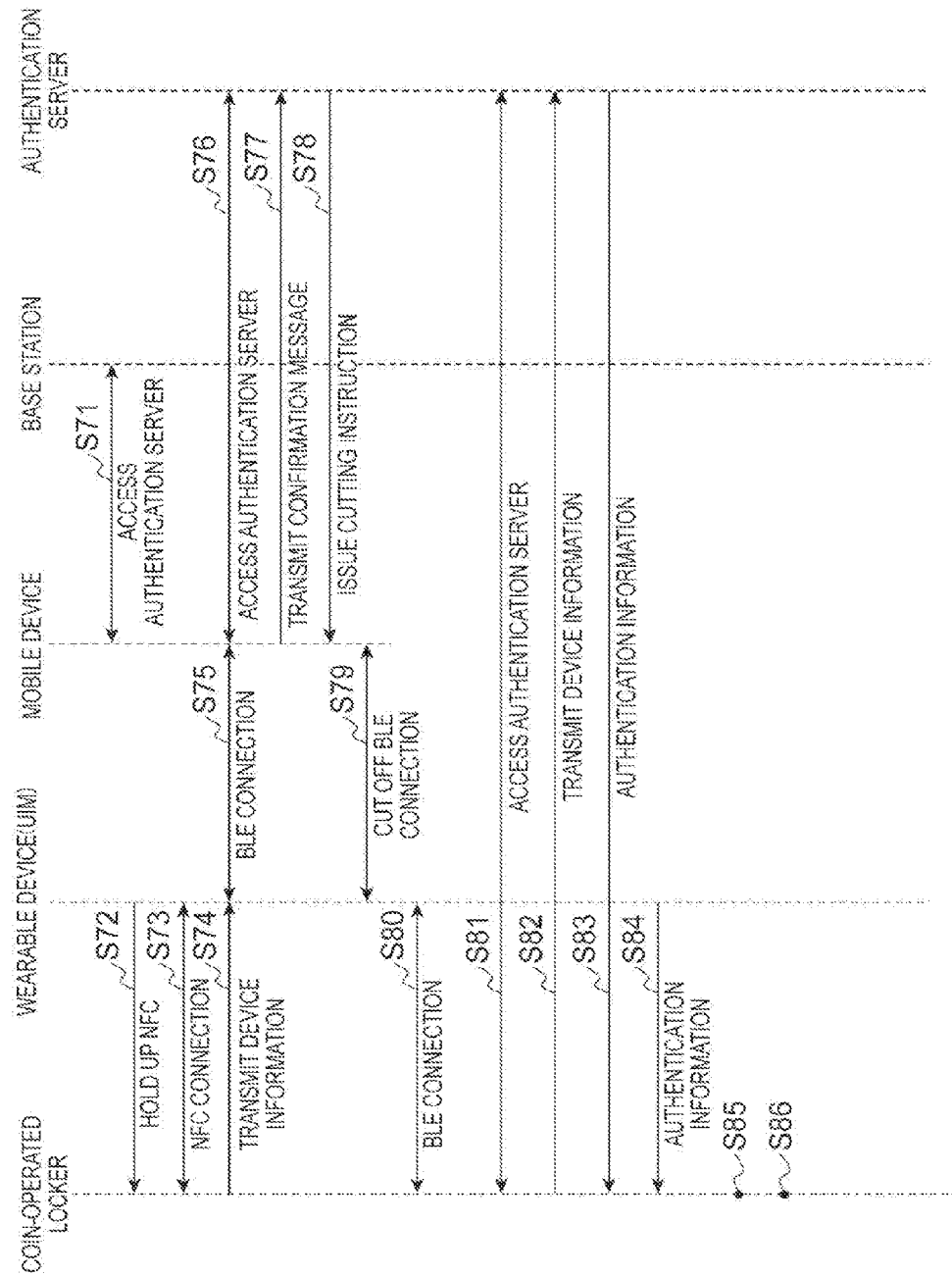

LOCKING CONTROL DEVICE, LOCKING CONTROL SYSTEM, AND LOCKING CONTROL METHOD

TECHNICAL FIELD

The present invention relates to a locking control device, a locking control system, and a locking control method.

BACKGROUND ART

A locking/unlocking device such as a safe or a coin-operated locker is known. In order to lock and unlock such a device, use of a key (physical key) or a password provided for the device can be considered.

When such a key or a password is lost or forgotten, there is a problem in that the device cannot be locked or unlocked. Use of an IC card (for example, a FeliCa (registered trademark) card) instead of such a key or password can also be considered. However, when the IC card is lost, there is a problem in that an IC card having the same card number cannot be reissued (a newly issued IC card has a different number). There is also a risk of duplication of the card number depending on the method in which it is implemented. Therefore, although it is possible to increase a security level of information held in the IC card itself, but the IC card is not necessarily suitable as a key used for locking and unlocking in consideration of the above-mentioned risk and problem when the IC card is lost or the like.

Therefore, a system for notifying of locking and unlocking on the basis of a telephone number of a caller is considered. For example, an authentication system that unlocks a door connected to an authentication device when a caller's number is transmitted from a mobile phone to the authentication device and the caller's number is coincident with a terminal number registered in the authentication device is known (see Patent Literature 1).

CITATION LIST

Patent Literature

Patent Literature 1: Japanese Unexamined Patent Publication No. 2001-285957

SUMMARY OF INVENTION

Technical Problem

In the authentication system described in Patent Literature 1, there is a problem in that a line contract of a mobile communication network is required for the authentication device to receive the call number and a maintenance cost for the line contract is required.

In order to solve the above-mentioned problems, an object of the present invention is to provide a locking control device, a locking control system, and a locking control method that can securely perform locking control, reissue an object or information for locking and unlocking when the object or information is lost, and reduce a maintenance cost of a line contract.

Solution to Problem

According to an embodiment of the present invention, there is provided a locking control device that performs locking or unlocking, including: communication information receiving means for receiving communication information, which is information for connection to a mobile communication network, from a communication device by communication other than mobile communication; authentication information receiving means for communicating with an authentication server, which holds authentication information which is information for authenticating the locking or unlocking, by mobile communication using the communication information received by the communication information receiving means and receiving authentication information corresponding to the communication information from the authentication server; authentication means for authenticating the locking or unlocking using the authentication information received by the authentication information receiving means; and locking control means for performing the locking or unlocking when the authentication by the authentication means succeeds.

According to the embodiment of the present invention, there is provided a locking control method which is performed by a locking control device that performs locking or unlocking, the locking control method including: a communication information receiving step of receiving communication information, which is information for connection to a mobile communication network, from a communication device by communication other than mobile communication; an authentication information receiving step of communicating with an authentication server, which holds authentication information which is information for authenticating the locking or unlocking, by mobile communication using the communication information received in the communication information receiving step and receiving authentication information corresponding to the communication information from the authentication server; an authentication step of authenticating the locking or unlocking using the authentication information received in the authentication information receiving step; and a locking control step of performing the locking or unlocking when the authentication in the authentication step succeeds.

According to the locking control device and the locking control method according to the embodiment of the present invention, the locking control device receives communication information from a communication device and communicates with the authentication server by mobile communication using the communication information. The locking control device receives authentication information from an authentication server. The locking control device performs authentication using the authentication information. According to this configuration, since the locking control device communicates with the authentication server by the mobile communication using the communication information, it is not necessary to make a line contract for a mobile communication network in the locking control device and it is possible to reduce a maintenance cost of a line contract. Since the authentication is performed using the authentication information received from the authentication server, it is possible to maintain a high security level. The communication information is information which can be reissued. That is, it is possible to securely perform locking control, to reissue an object or information for locking and unlocking even when the object or information is lost, and to reduce a maintenance cost of a line contract.

In the locking control device according to the embodiment of the present invention, the communication information receiving means may receive the communication information by short-range wireless communication. According to this locking control device, the communication information is received when a user causes the communication device to approach the locking control device. Accordingly, when the user has an intention to lock or unlock the locking control device, the locking control device can communicate with the authentication server.

In the locking control device according to the embodiment of the present invention, the authentication information receiving means may receive communication-device authentication information which is authentication information held by the communication device from the communication device, and the authentication means may authenticate additionally using the communication-device authentication information received by the authentication information receiving means. According to this locking control device, since the authentication information is received from both the authentication server and the communication device and the authentication is performed on the basis of the authentication information received from both, it is possible to perform securer authentication in comparison with a case in which the authentication is performed using authentication information received from a single device.

The locking control device according to the embodiment of the present invention may further include: authentication information generating means for generating the authentication information; and authentication information transmitting means for transmitting the authentication information generated by the authentication information generating means to the authentication server by mobile communication using the communication information received by the communication information receiving means, and the authentication information receiving means may receive the authentication information transmitted by the authentication information transmitting means from the authentication server. In this case, it is possible to perform authentication using the authentication information generated by the locking control device. Accordingly, it is possible to generate authentication information without receiving an input of authentication information from a user.

According to an embodiment of the present invention, there is provided a locking control system including a communication device that communicates with a locking control device that performs locking or unlocking, wherein the locking control device includes: communication information receiving means for receiving communication information, which is information for connection to a mobile communication network, from the communication device by communication other than mobile communication; authentication information receiving means for communicating with an authentication server, which holds authentication information which is information for authenticating the locking or unlocking, by mobile communication using the communication information received by the communication information receiving means and receiving the authentication information corresponding to the communication information from the authentication server; authentication means for authenticating the locking or unlocking using the authentication information received by the authentication information receiving means; and locking control means for performing the locking or unlocking when the authentication by the authentication means succeeds, and the communication device includes: communication information holding means for holding the communication information; and communication information transmitting means for communicating with the locking control device by the communication other than the mobile communication, and transmitting the communication information to the locking control device by the communication, as triggered by performing the communication with the locking control device.

According to the embodiment of the present invention, there is provided a locking control method which is performed by a locking control system including a communication device that communicates with a locking control device that performs locking or unlocking, wherein the communication device includes communication information holding means for holding communication information which is information for connection to a mobile communication network, the locking control device performs: a communication information receiving step of receiving the communication information from a communication device by communication other than mobile communication; an authentication information receiving step of communicating with an authentication server, which holds authentication information which is information for authenticating the locking or unlocking, by mobile communication using the communication information received in the communication information receiving step and receiving authentication information corresponding to the communication information from the authentication server; an authentication step of authenticating the locking or unlocking using the authentication information received in the authentication information receiving step; and a locking control step of performing the locking or unlocking when the authentication in the authentication step succeeds, and the communication device performs a communication information transmitting step of communicating with the locking control device by the communication other than the mobile communication, and transmitting the communication information to the locking control device by the communication, as triggered by performing the communication with the locking control device.

The locking control system according to the embodiment of the present invention may further include comparison means for comparing a position of the locking control device at a timing of communication with the authentication server by the mobile communication using the communication information which is performed by the locking control device and a position of a device performing the mobile communication when the mobile communication using communication information corresponding to the communication information is performed and outputting a comparison result to the locking control device, the authentication information receiving means may receive the comparison result output from the comparison means, and the authentication means may perform authentication also on the basis of the comparison result received by the authentication information receiving means. According to this locking control system, the locking control device receives the comparison result of a base station which is used in the mobile communication and a base station which is used in the communication corresponding to the mobile communication at the timing of communication with the authentication server by the mobile communication from the authentication server and performs the authentication on the basis of the comparison result. Accordingly, it is possible to determine whether the communication information is abused for the locking control system.

Advantageous Effects of Invention

According to an embodiment of the present invention, it is possible to securely perform locking control, to reissue an object or information for locking and unlocking even when the object or information is lost, and to reduce a maintenance cost of a line contract.

BRIEF DESCRIPTION OF DRAWINGS

FIG. 7 is a sequence diagram (2) of processes which are performed by the locking system.

FIG. 8 is a sequence diagram (3) of processes which are performed by the locking system.

FIG. 9 is a sequence diagram (4) of processes which are performed by the locking system.

DESCRIPTION OF EMBODIMENTS

Hereinafter, embodiments of the present invention will be described in detail with reference to the accompanying drawings. In describing the drawings, like elements will be referenced by like reference signs and description thereof will not be repeated.

Figure 1:
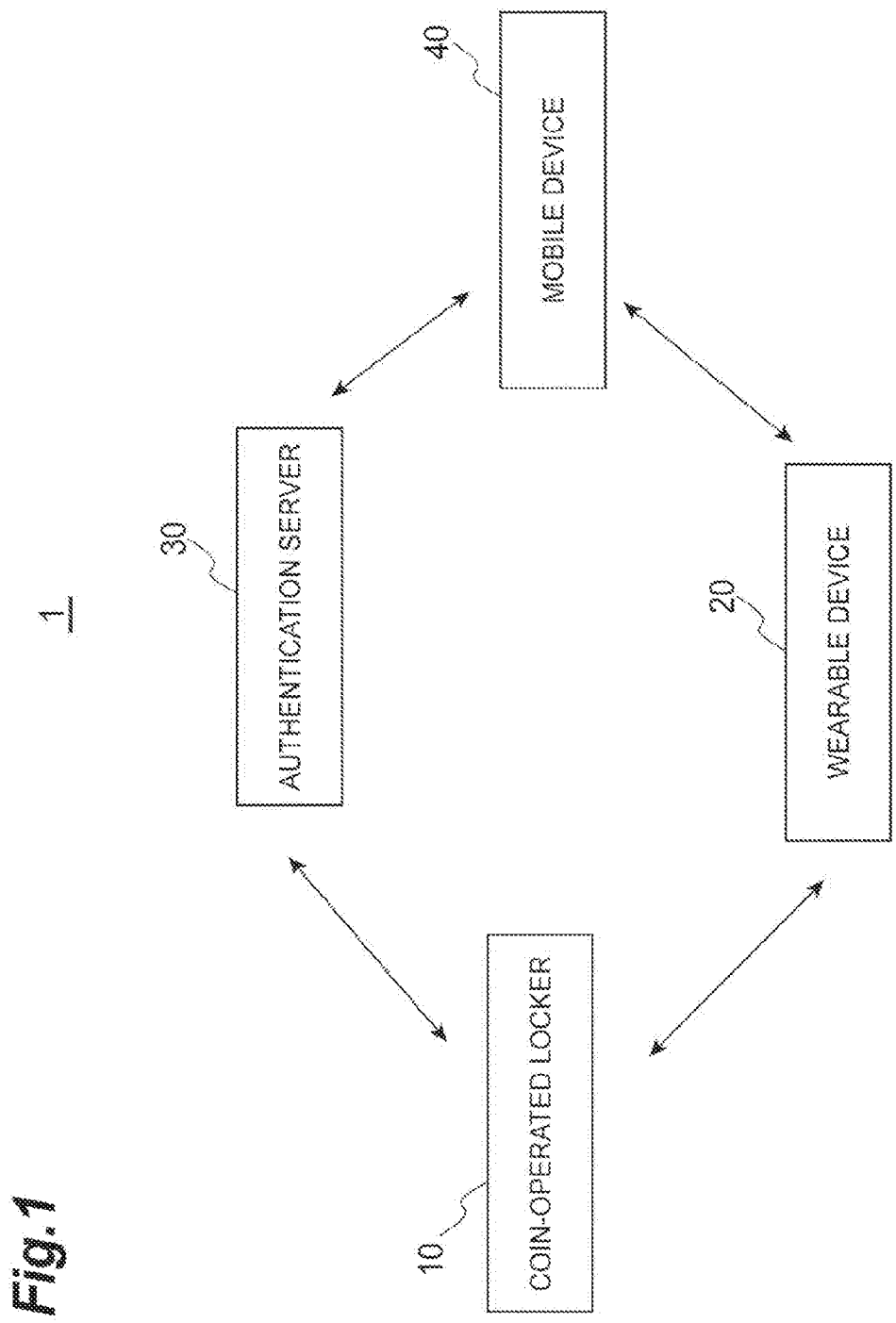
FIG. 1 is a diagram schematically illustrating a locking system according to an embodiment of the present invention.

FIG. 1 illustrates a locking control system 1 (locking control system) according to an embodiment of the present invention. The locking control system 1 includes a coin-operated locker 10 (locking control device), a wearable device 20 (communication device), an authentication server 30 (authentication server and a mobile device 40.

The coin-operated locker 10 is a coin-operated locker having communication means (communication means for short-range wireless communication and communication means for mobile communication). The coin-operated locker 10 is disposed near a station, at an event site, in a shopping center, and the like (in a place in which a user is likely to temporarily put heavy baggage). In general, a plurality of coin-operated lockers 10 are disposed in a stacked state or an arranged state. The coin-operated locker 10 includes a box-like space that can accommodate an object and a door that can open and close the space. The coin-operated locker 10 can lock and unlock the door. For example, when the coin-operated locker 10 locks the space in a state in which an object is put in the space, the object in the space cannot be taken out unless the door is unlocked. The coin-operated locker 10 controls locking and unlocking using authentication information for locking and unlocking. Here, the authentication information is information which is used for authentication at the time of locking and unlocking.

The wearable device 20 is a device which a user can wear and is a so-called wearable module. Specifically, the wearable device 20 need only have a short-range wireless communication function as a function of inputting and outputting information with respect to the outside and need not have functions of screen display, voice output, operation input, and the like. The wearable device may have such functions. A specific shape of the wearable device 20 may be any shape such as a ring shape or a wrist watch shape as long as a user can wear it.

The wearable device 20 includes at least one UIM. The UIM includes user identity module (UIM) information (communication information) which is information for connection to a mobile communication network. The mobile communication network is provided by a communication common carrier. The coin-operated locker 10 and the mobile device 40 receive UIM information from the wearable device 20. The coin-operated locker 10 and the mobile device 40 attain authentication for connection to the mobile communication network using the UIM information received from the wearable device 20 and access the mobile communication network. In this way, the coin-operated locker 10 and the mobile device 40 can communicate with the authentication server 30 via the mobile communication network. Here, the UIM information refers to line information which is stored in the UIM. The UIM information is issued for a contractor having made a line contract with a communication common carrier which operates the mobile communication network.

The authentication server 30 is a server device that manages the UIM information which is specified by the communication with the coin-operated locker 10, the authentication information which is received from the coin-operated locker 10, and device information of the coin-operated locker 10. The authentication server transmits the authentication information in response to an authentication information transmission request from the coin-operated locker 10. The authentication server 30 can be accessed from the outside via a mobile communication network. The authentication server 30 is provided, for example, by a communication common carrier of the mobile communication network.

The mobile device 40 is a communication terminal such as a mobile phone or a smartphone. The mobile device 40 is connected to the wearable device 20 by short-range wireless communication, receives the UIM information therefrom, and communicates with the authentication server 30 using the UIM information. The mobile device 40 has a confirmation application which is an application for confirming locking or unlocking of the coin-operated locker 10 (confirming an intention to lock or unlock the coin-operated locker) and confirms locking or unlocking by an input from a user, for example, in a state in which the coin-operated locker 10 and the wearable device 20 are connected to each other.

The wearable device 20 and the mobile device 40 can communicate with each other by short-range wireless communication (for example, Bluetooth (registered trademark) Low Energy (BLE) or Near Field Communication (NFC)). In general, communication coverage of BLE ranges from about 10 m to 50 m and communication coverage of NFC is about 10 cm. That is, the communication coverage of NFC is smaller than the communication coverage of BLE. The coin-operated locker 10 and the wearable device 20 can communicate with each other by short-range wireless communication. The authentication server 30 and the mobile device 40 can communicate with each other by mobile communication (for example, mobile communication such as 3G or LTE). When communication is performed by the mobile communication, equipment of a mobile communication network such as a base station is used for the communication. The wearable device 20 and the coin-operated locker 10 can communicate with each other by the short-range wireless communication. The coin-operated locker 10 and the authentication server 30 communicate with each other by the mobile communication. Specifically, the coin-operated locker 10 receives the UIM information from the wearable device 20 approaching the coin-operated locker 10 and communication by the mobile communication is performed using the UIM information. The mobile device 40 and the wearable device 20 may be incorporated into a single body. In general, a user of the mobile device 40 and a user of the wearable device 20 are the same person. The user is considered to carry the mobile device 40 and the wearable device 20. Accordingly, the mobile device 40 and the wearable device 20 can perform the short-range wireless communication with each other.

Processes in the locking control system 1 will be described below in brief. When a user holds the wearable device 20 up to the coin-operated locker 10, the coin-operated locker 10 and the wearable device 20 perform short-range wireless communication with each other. The coin-operated locker 10 receives UIM information from the wearable device 20 and performs the mobile communication with the authentication server 30 using the received UIM information.

The coin-operated locker 10 transmits device information to the authentication server 30 and transmits a part of the authentication information generated by the coin-operated locker 10 to the authentication server 30. The coin-operated locker 10 transmits the rest of the authentication information to the wearable device 20. When the coin-operated locker 10 transmits the authentication information to the authentication server 30 and the wearable device 20, the door of the coin-operated locker 10 is locked.

When the user's wearable device 20 used at the time of locking approaches the coin-operated locker 10 again in a state in which the door is locked, the coin-operated locker 10 and the wearable device 20 perform the short-range wireless communication with each other. The coin-operated locker 10 receives the UIM information from the wearable device 20 and performs the mobile communication with the authentication server 30 via the mobile communication network using the UIM information.

The coin-operated locker 10 receives the authentication information from the wearable device 20 and the authentication server 30 in this state and compares the received authentication information with authentication information held in the coin-operated locker 10, and the coin-operated locker 10 is unlocked when the authentication succeeds.

In this way, since the coin-operated locker 10 communicates with the authentication server 30 by the mobile communication using the UIM information, it is not necessary for the coin-operated locker 10 to make a line contract for the mobile communication network and it is possible to reduce a maintenance cost. This ends the brief description of the processes in the locking control system 1.

Figure 2:
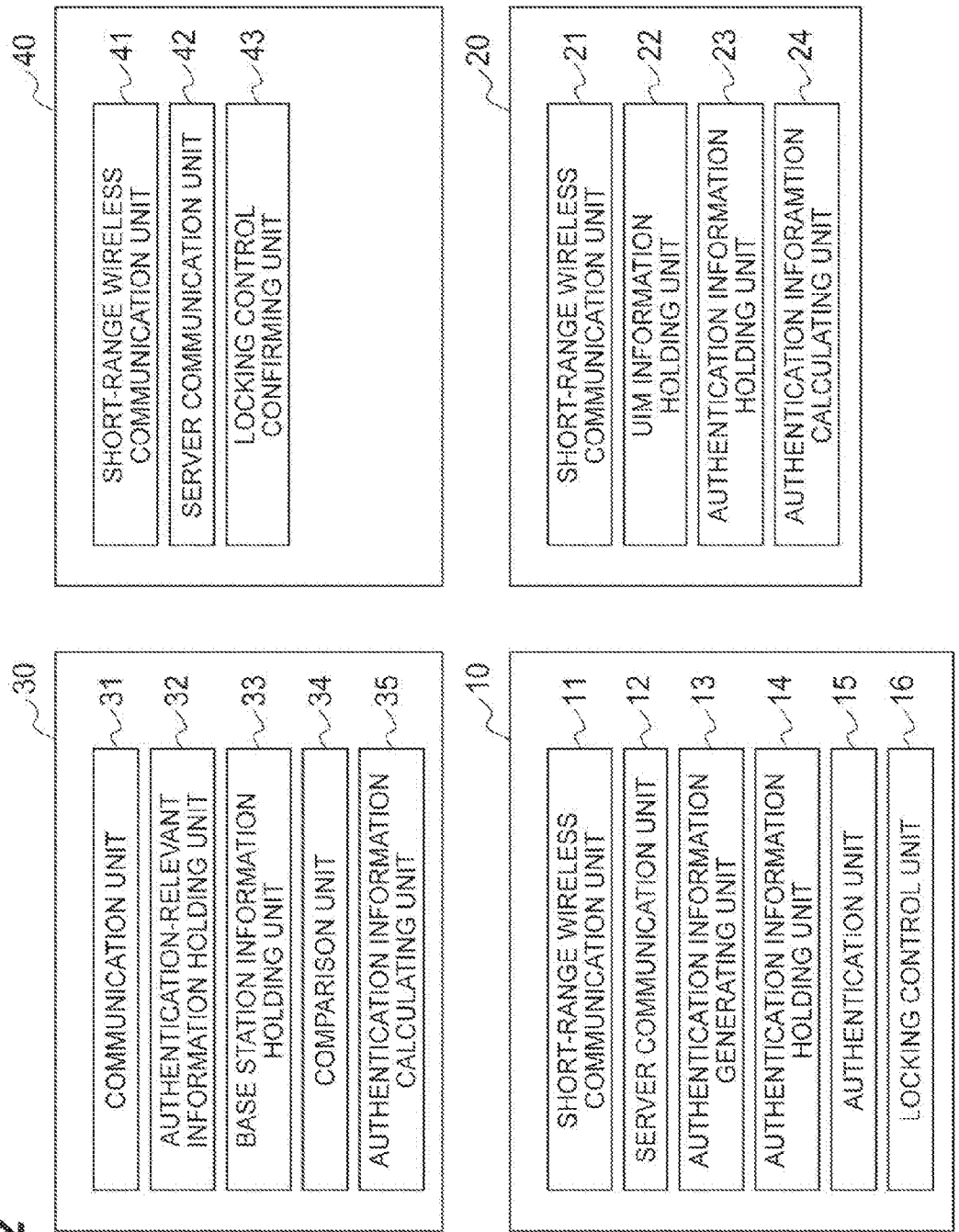
FIG. 2 is a block diagram of the locking system according to the embodiment of the present invention.

Functional block diagrams of the coin-operated locker 10, the wearable device 20, the authentication server 30, and the mobile device 40 are illustrated in FIG. 2. First, the coin-operated locker 10 will be described. The coin-operated locker 10 includes a short-range wireless communication unit 11 (communication information receiving means, authentication information receiving means), a server communication unit 12 (authentication information receiving means, authentication information transmitting means), an authentication information generating unit 13 (authentication information generating means), an authentication information holding unit 14, an authentication unit 15 (authentication means), and a locking control unit 16 (locking control means).

The short-range wireless communication unit 11 is a part that performs short-range wireless communication with the wearable device 20. Specifically, the short-range wireless communication with the wearable device 20 is performed by NFC or BLE. The short-range wireless communication unit 11 detects an approach of the wearable device 20 caused by a user by detecting a nearby communicable device at predetermined intervals using a known technique. When intending to lock or unlock the coin-operated locker 10, the user causes the wearable device 20 to approach the coin-operated locker 10. When an approach of the wearable device 20 is detected, the short-range wireless communication unit 11 communicates with the wearable device 20 by NFC. That is, the short-range wireless communication unit 11 and a short-range wireless communication unit 21 are connected to each other (linked state). This is because the communication coverage is narrower than that of the communication based on BLE and thus a communication partner can be more satisfactorily specified by the communication based on NFC.

When the approach of the wearable device 20 is detected, the short-range wireless communication unit 11 specifies a current locking state with reference to information of the current locking state (information which is held in the authentication information holding unit 14 to be described later of the coin-operated locker 10 and which indicates whether the coin-operated locker 10 is locked or unlocked) in the coin-operated locker 10 and determines whether the user's request is a locking request or an unlocking request. For example, when the current locking state is an unlocked state, the short-range wireless communication unit 11 determines that the user's request is the locking request. On the other hand, when the current locking state is a locked state, the short-range wireless communication unit 11 determines that the user's request is the unlocking request.

When connection to the wearable device 20 based on NFC is attained, the short-range wireless communication unit 11 transmits device information of the coin-operated locker 10 to the wearable device 20. The device information need not be information for specifying the device (coin-operated locker) itself and need only be information capable of determining at least a type of the device (device type information). The short-range wireless communication unit 11 may transmit identification information of the coin-operated locker 10 to the wearable device 20 separately from the device type information. Here, the identification information of the coin-operated locker 10 is information capable of identifying the coin-operated locker and is a coin-operated locker ID such as a production serial number of the coin-operated locker 10. The coin-operated locker ID is held in storage means of the coin-operated locker 10 in advance. The short-range wireless communication unit 11 may additionally transmit the current locking state. The short-range wireless communication unit 21 of the wearable device 20 determines whether the coin-operated locker is a device for BLE connection with reference to the device information. When the short-range wireless communication unit 21 of the wearable device 20 determines that the device information indicates a device for BLE connection, the short-range wireless communication unit 11 is connected to the short-range wireless communication unit 21 by BLE.

Specifically, when the wearable device 20 is not connected by BLE to the mobile device 40 by the short-range wireless communication unit 21 and it is determined that the coin-operated locker 10 can be connected thereto by BLE with reference to the device information, the short-range wireless communication unit can be connected to the short-range wireless communication unit 21 by BLE. When the wearable device 20 is connected by BLE to the mobile device 40 by the short-range wireless communication unit 21, the short-range wireless communication unit 21 cuts off the BLE connection to the mobile device 40.

The short-range wireless communication unit 11 periodically receives the UIM information held in the wearable device 20 during BLE connection to the short-range wireless communication unit 21. Accordingly, the server communication unit 12 to be described later can communicate with the authentication server 30 via the mobile communication network using the UIM information. That is, the short-range wireless communication unit 11 can be connected to the authentication server 30 via the mobile communication network. In this way, the short-range wireless communication unit 11 receives the UIM information from the wearable device 20 by the short-range wireless communication (communication other than the mobile communication).

When it is determined that the user's request is the locking request as described above, the short-range wireless communication unit 11 notifies the authentication information generating unit 13 and the server communication unit 12 to be described later that the user's request is the locking request. Thereafter, the short-range wireless communication unit 11 receives authentication information for the wearable device 20 among the authentication information generated by the authentication information generating unit 13 in response to the notification and transmits the authentication information for the wearable device 20 to the wearable device 20. The authentication information for the wearable device 20 is encrypted. The method of generating authentication information in the authentication information generating unit 13 will be described later.

When it is determined that the user's request is the unlocking request as described above, the short-range wireless communication unit 11 notifies the authentication information generating unit 13 and the server communication unit 12 that the user's request is the unlocking request. Thereafter, the short-range wireless communication unit 11 receives a random number from the authentication information generating unit 13 and transmits the random number to the wearable device 20 (at this time, the short-range wireless communication unit 11 also transmits an authentication information transmission request for the wearable device to the wearable device 20). The random number is a random number for encrypting the transmitted authentication information (the authentication information for the wearable device 20) to the wearable device 20. The short-range wireless communication unit 11 receives the authentication information for the wearable device (communication-device authentication information) which is encrypted using the transmitted random number from the wearable device 20. The short-range wireless communication unit 11 sends out the received authentication information for the wearable device 20 to the authentication unit 15. The authentication unit 15 performs authentication using the authentication information for the wearable device 20.

The server communication unit 12 is a part that communicates with the authentication server 30. Specifically, the server communication unit communicates with the authentication server 30 by the mobile communication using the UIM information received by the short-range wireless communication unit 11. The coin-operated locker 10 has a mobile communication function but does not have a UIM. Accordingly, the coin-operated locker 10 itself cannot perform the mobile communication (connection to the mobile communication network), but performs the mobile communication using the UIM information received from the wearable device 20 as described above. The coin-operated locker 10 may hold a UIM. The server communication unit 12 communicates with the authentication server 30 via a predetermined base station included in the mobile communication network, and transmits the UIM information and the coin-operated locker ID as the identification information of the coin-operated locker 10 to the base station at the time of communication. The base station transmits the UIM information, the coin-operated locker ID, and information for specifying the base station (for example, base station ID) to the authentication server 30.

When the notification of the locking request is received from the short-range wireless communication unit 11, the server communication unit 12 transmits the coin-operated locker ID and information of the current locking state in the coin-operated locker 10 to the authentication server 30. Thereafter, the server communication unit 12 receives authentication information for the authentication server 30 among the authentication information generated by the authentication information generating unit 13 and transmits the authentication information for the authentication server 30 to the authentication server 30. The authentication information for the authentication server 30 is encrypted.

When the notification of the unlocking request is received from the short-range wireless communication unit 11, the server communication unit 12 transmits the coin-operated locker ID and the information of the current locking state in the coin-operated locker 10 to the authentication server 30. Then, the server communication unit 12 receives a random number (the same as the random number which is received from the authentication information generating unit 13 by the short-range wireless communication unit 11) from the authentication information generating unit 13 and transmits the random number to the authentication server 30 (at this time, the server communication unit 12 also transmits a transmission request for authentication information for the authentication server to the authentication server 30). The random number is a random number for encrypting the transmitted authentication information (the authentication information for the authentication server 30) in the authentication server 30. The server communication unit 12 receives the authentication information for the authentication server 30, which has been encrypted using the transmitted random number, from the authentication server 30. The server communication unit 12 sends out the authentication information for the authentication server 30 to the authentication unit 15. The authentication unit 15 performs authentication using the authentication information for the authentication server 30.

When the notification of the unlocking request is received from the short-range wireless communication unit 11, the server communication unit 12 may receive a comparison result (comparison result) of information of the base station when the coin-operated locker 10 performs the mobile communication with the authentication server 30 and information of the base station when the mobile device 40 performs the mobile communication with the authentication server 30 by the authentication server 30 instead of the authentication information for the authentication server 30 (or in addition to the authentication information) from the authentication server 30. In this case, the server communication unit 12 sends out the comparison result to the authentication unit 15.

The authentication information generating unit 13 receives the notification of the unlocking request or the notification of the unlocking request from the short-range wireless communication unit 11 and performs processes such as generating the authentication information in response to the reception.

Specifically, when the notification of the locking request is received, the authentication information generating unit 13 generates a random number of multiple digits and uses the random number as the authentication information. The authentication information generating unit 13 divides the authentication information into the authentication information for the authentication server and the authentication information for the wearable device. Specifically, the authentication information generating unit 13 sets a value from the first digit (the highest digit) to the half digit in the generated authentication information as the authentication information for the authentication server. The authentication information generating unit 13 sets a value from the final digit (the lowest digit) to the half digit in the generated authentication information as the authentication information for the wearable device 20. After dividing the authentication information into the authentication information for the authentication server and the authentication information for the wearable device, the authentication information generating unit 13 generates a random number for encryption. The authentication information generating unit 13 encrypts the authentication information for the authentication server and the authentication information for the wearable device using the random number for encryption by a known encryption technique. The authentication information generating unit 13 stores the generated authentication information (the authentication information before division into the authentication information for the authentication server and the authentication information for the wearable device) and the random number for encryption in storage means (the authentication information holding unit 14) of the coin-operated locker 10. The authentication information generating unit 13 may store the generated authentication information in the authentication information holding unit 14 in correlation with the DIM information received by the short-range wireless communication unit 11 at the time of generation of the authentication information.

The authentication information generating unit 13 sends out the authentication information for the wearable device to the short-range wireless communication unit 11 and sends out the authentication information for the authentication server to the server communication unit 12. After sending out the authentication information for the wearable device to the short-range wireless communication unit 11 and sending out the authentication information for the authentication server to the server communication unit 12, the authentication information generating unit 13 notifies the locking control unit 16 of the locking request.

When the notification of the unlocking request is received from the short-range wireless communication unit 11, the authentication information generating unit 13 generates a random number for encryption and sends out the random number to the short-range wireless communication unit 11 and the server communication unit 12. The random number is different from the random number generated when the notification of the locking request is received from the short-range wireless communication unit 11. The authentication information generating unit 13 may set the random number sent out to the short-range wireless communication unit 11 and the random number sent out to the server communication unit 12 to be different from each other. The authentication information generating unit 13 also stores the random number for encryption in the storage means (the authentication information holding unit 14) of the coin-operated locker 10.

The authentication information holding unit 14 is a part that holds the authentication information (which also includes the random number for encryption) generated by the authentication information generating unit 13 or the information of the current locking state.

Specifically, the authentication information holding unit 14 holds the authentication information (the authentication information for the wearable device 20 and the authentication information for the authentication server 30) generated by the authentication information generating unit 13 when the notification of the locking request is received from the short-range wireless communication unit 11 and the random number for encrypting the authentication information as the authentication information generated by the authentication information generating unit 13. The authentication information holding unit 14 also holds the random number generated by the authentication information generating unit 13 when the notification of the unlocking request is received from the short-range wireless communication unit 11 as the authentication information generated by the authentication information generating unit 13. After the authentication information for the wearable device and the authentication information for the authentication server are received, the authentication unit 15 acquires the authentication information and the random number generated by the authentication information generating unit 13 when the locking request is received and the random number generated by the authentication information generating unit 13 when the unlocking request is received.

The authentication information holding unit 14 holds the result of the locking control process (an unlocking process, a locking process) by the locking control unit 16 as the information of the current locking state. After BLE connection to the wearable device 20, the short-range wireless communication unit 11 refers to the information of the current locking state to specify the user's request as described above. The locking control unit 16 edits the information of the current locking state in the locking control process by the locking control unit 16 to be described later.

The authentication unit 15 is a part that authenticates locking or unlocking using the authentication information for the wearable device received from the short-range wireless communication unit 11 and the authentication information for the authentication server received from the server communication unit 12. Specifically, after the authentication information for the wearable device and the authentication information for the authentication server are received, the authentication unit 15 acquires the authentication information and the random number generated by the authentication information generating unit 13 when the locking request is received and the random number generated by the authentication information generating unit 13 when the unlocking request is received from the authentication information holding unit 14. The authentication unit 15 decrypts the authentication information for the wearable device received from the short-range wireless communication unit 11 and the authentication information for the authentication server received from the server communication unit 12 using the random number generated by the authentication information generating unit 13 when the locking request is received and the random number generated by the authentication information generating unit 13 when the unlocking request is received by a known technique.

The authentication unit 15 performs authentication by comparing the authentication information acquired from the authentication information holding unit 14 with information (information in which the decrypted authentication information for the authentication server is set to higher digits and the decrypted authentication information for the wearable device is set to lower digits) in which the decrypted authentication information for the authentication server and the decrypted authentication information for the wearable device are combined.

When the combined information is coincident with the authentication information acquired from the authentication information holding unit 14, the authentication unit 15 determines that the authentication succeeds. When the combined information is not coincident with the authentication information held in the authentication information holding unit 14, the authentication unit 15 determines that the authentication fails. When the authentication server 30 receives information indicating an error as the comparison result of the information of the base station when the coin-operated locker 10 performs the mobile communication with the authentication server 30 and the information of the base station when the mobile device 40 performs the mobile communication with the authentication server, the authentication unit 15 determines that the authentication fails regardless of whether the combined information is coincident with the authentication information held in the authentication information holding unit 14. The authentication result by the authentication unit 15 is sent to the locking control unit 16. The locking control unit 16 performs the locking control on the basis of the authentication result.

Before determining whether the combined information is coincident with the authentication information acquired from the authentication information holding unit 14, the authentication unit 15 may compare the UIM information received by the short-range wireless communication unit 11 and the UIM information held in the authentication information holding unit 14. For example, when the UIM information received by the short-range wireless communication unit 11 is coincident with the UIM information held in the authentication information holding unit 14, the authentication unit 15 determines whether the combined information is coincident with the authentication information acquired from the authentication information holding unit 14. When the UIM information received by the short-range wireless communication unit 11 is not coincident with the UIM information held in the authentication information holding unit 14, the authentication unit 15 determines that the authentication fails without determining whether the combined information is coincident with the authentication information acquired from the authentication information holding unit 14.

The locking control unit 16 is a part that controls locking or unlocking of the door of the coin-operated locker 10. As described above, the locking control unit 16 performs the locking control on the basis of the authentication result from the authentication unit 15. When the authentication by the authentication unit 15 succeeds, the locking control unit 16 performs locking or unlocking. That is, in the case in which the authentication by the authentication unit 15 succeeds, the locking control unit 16 locks the door when the information of the current locking state held in the authentication information holding unit 14 indicates "unlocking," and unlocks the door when the information of the current locking state held in the authentication information holding unit 14 indicates "locking." When the authentication by the authentication unit 15 does not succeed, the locking control unit 16 does not perform the locking or unlocking. When the locking request is received from the authentication information generating unit 13, the locking control unit 16 locks the door. Then, the locking control unit 16 edits the information of the current locking state held in the authentication information holding unit 14 on the basis of details of the locking control.

Subsequently, the wearable device 20 will be described. The wearable device 20 includes a short-range wireless communication unit (communication information transmitting means), a TIM information holding unit 22 (communication information holding means), an authentication information holding unit 23, and an authentication information calculating unit 24.

The short-range wireless communication unit 21 performs short-range wireless communication with the coin-operated locker 10 by the NFC or the BLE. The short-range wireless communication unit 21 performs short-range wireless communication with the mobile device 40 by the NFC or the BLE.

First, the short-range wireless communication between the short-range wireless communication unit 21 and a short-range wireless communication unit 41 of the mobile device 40 will be described. It is assumed that the mobile device 40 does not have a UIM. When the wearable device 20 is located in the vicinity of the mobile device 40 (for example, when a user causes the wearable device 20 to approach the mobile device 40), the short-range wireless communication unit 41 of the mobile device 40 detects the wearable device 20 and thus the short-range wireless communication unit 21 performs the short-range wireless communication with the mobile device 40. When performing the short-range wireless communication with the mobile device 40, the short-range wireless communication unit 21 may be first NFC-connected thereto and then the short-range wireless communication unit 21 may be BLE-connected to the mobile device 40. For example, the short-range wireless communication unit 21 receives type information of the mobile device 40 from the mobile device 40 by the NFC, determines whether the type information is included in the BLE connection target held in the wearable device 20, and is BLE-connected to the mobile device 40 when the type information is included in the BLE connection target. The short-range wireless communication unit 21 may be BLE-connected to the short-range wireless communication unit 41 without being NFC-connected thereto.

When the short-range wireless communication unit 21 and the short-range wireless communication unit 41 of the mobile device 40 are BLE-connected to each other, the short-range wireless communication unit 21 transmits the UIM information held in the UIM information holding unit 22 to the short-range wireless communication unit 41 at predetermined intervals (for example, intervals based on specifications of the mobile communication) and the short-range wireless communication unit 21 receives the UIM information. Accordingly, the mobile device 40 can communicate with the authentication server 30 via the mobile communication network using the UIM information. That is, the short-range wireless communication unit 41 of the mobile device 40 receives the UIM information and the server communication unit 42 accesses the mobile communication network using the UIM information, whereby the mobile device can communicate with the authentication server 30 via the mobile communication network.

Subsequently, the short-range wireless communication between the short-range wireless communication unit 21 and the short-range wireless communication unit 11 will be described. When the wearable device 20 is located in the vicinity of the coin-operated locker 10 (for example, when a user causes the wearable device 20 to approach the coin-operated locker 10), the short-range wireless communication unit 11 of the coin-operated locker 10 detects the wearable device 20 and thus the short-range wireless communication unit 21 performs short-range wireless communication with the coin-operated locker 10.

The short-range wireless communication unit 11 of the coin-operated locker 10 and the short-range wireless communication unit 21 perform NFC communication with each other. This is because the communication coverage of the NFC is shorter and thus there is no possibility that the communication partner will be misunderstood in the NFC communication (a plurality of communication partners will be present).

The short-range wireless communication unit 21 receives the device type information of the coin-operated locker 10 (the type of the coin-operated locker or the like) from the short-range wireless communication unit 11 by the NFC. The short-range wireless communication unit 21 may receive the coin-operated locker ID or the information of the current locking state from the short-range wireless communication unit 11. The short-range wireless communication unit transmits the UIM information to the short-range wireless communication unit 11 by the short-range wireless communication, as triggered by performing the short-range wireless communication with the coin-operated locker 10 based on the NFC.

Specifically, when the short-range wireless communication unit 21 is NFC-connected to the coin-operated locker 10 as described above, the short-range wireless communication unit 21 receives the device type information from the coin-operated locker 10 and then determines whether the device type information is included in the device types which are BLE-connectable and which are defined in the short-range wireless communication unit 21 in advance with reference to the device type information.

When it is determined that the coin-operated locker is BLE-connectable, the short-range wireless communication unit 21 is BLE-connected to the coin-operated locker 10 on the premise that it is not BLE-connected to the mobile device 40. When the short-range wireless communication unit 21 is BLE-connected to the coin-operated locker 10, the short-range wireless communication unit 21 transmits the UIM information held in the UIM information holding unit 22 to the short-range wireless communication unit 11 of the coin-operated locker 10 periodically (for example, at the timing based on specifications of the mobile communication). The short-range wireless communication unit 11 receives the UIM information. In this way, by causing the short-range wireless communication unit 11 of the coin-operated locker to receive the UIM information and causing the server communication unit 12 to access the mobile communication network using the UIM information, the coin-operated locker 10 can communicate with the authentication server 30 via the mobile communication network.

The short-range wireless communication unit 21 is NFC-connected to the coin-operated locker 10, receives the device type information from the coin-operated locker 10, and cuts off the BLE connection to the mobile device 40 when it is determined that the coin-operated locker is BLE-connectable and the wearable device 20 has only one UIM and is BLE-connected to the mobile device 40. The UIM information allows only one device to be used at the same time. Accordingly, when the mobile device 40 performs the mobile communication using the UIM information of the wearable device 20, the short-range wireless communication unit 21 cuts off the BLE connection to the mobile device 40 for the coin-operated locker 10 to perform the mobile communication using the UIM information of the wearable device 20.

As the method of cutting off the BLE connection to the mobile device 40, a method of transmitting a cutting request from the short-range wireless communication unit 21 to the short-range wireless communication unit 41 or a method of cutting off the BLE connection on the basis of start of a confirmation application of the mobile device 40 can be used. The method of cutting off the BLE connection on the basis of start of the confirmation application is a method of cutting off the BLE connection in accordance with a cutting instruction from the authentication server 30 after the locking or unlocking of the coin-operated locker is confirmed by the confirmation application of the mobile device 40. A start request of the confirmation application from the short-range wireless communication unit 21 to the short-range wireless communication unit 41 or a device information reception notification from the coin-operated locker 10 from the short-range wireless communication unit 21 to the short-range wireless communication unit 41 can be used as a trigger for starting the confirmation application.

When the authentication information corresponding to the coin-operated locker ID of the coin-operated locker 10 under connection is not held in the authentication information holding unit 23 to be described later (when the coin-operated locker 10 is locked), the short-range wireless communication unit 21 receives the coin-operated locker ID and the encrypted authentication information for the wearable device from the short-range wireless communication unit 11. Then, the short-range wireless communication unit 21 holds the coin-operated locker ID and the encrypted authentication information for the wearable device in the authentication information holding unit 23 in correlation with each other.

When the authentication information corresponding to the coin-operated locker ID of the coin-operated locker 10 under connection is held in the authentication information holding unit 23 (when the coin-operated locker 10 is unlocked), the short-range wireless communication unit 21 receives the random number for encryption from the short-range wireless communication unit 11. The short-range wireless communication unit 21 sends out the random number to the authentication information calculating unit 35 to be described later. The authentication information calculating unit 24 additionally encrypts the authentication information for the wearable device using the random number and the authentication information for the wearable device.

The short-range wireless communication unit 21 transmits the authentication information for the wearable device encrypted by the authentication information calculating unit 35 to the short-range wireless communication unit 11. The encrypted authentication information for the wearable device is used for the authentication unit 15 to perform authentication.

The UIM information holding unit 22 is a part that holds the UIM information. The UIM information holding unit is embodied by UIM storage means (a hard configuration example of the UIM will be described later) of the wearable device 20. Under the short-range wireless communication with the coin-operated locker 10 or the mobile device 40, the short-range wireless communication unit 21 transmits the UIM information held in the UIM information holding unit 22 to the short-range wireless communication partner.

The authentication information holding unit 23 is a part that holds and stores the authentication information received from the coin-operated locker 10 by the short-range wireless communication unit 21. The authentication information holding unit 23 may hold the authentication information received from the coin-operated locker 10 in correlation with the coin-operated locker ID. In this case, when a plurality of coin-operated lockers 10 are used and the coin-operated locker ID is received from the coin-operated locker 10, the authentication information to be transmitted at the time of authentication can be specified. The authentication information holding unit 23 may hold the authentication information in correlation with the DIM information to be transmitted to the coin-operated locker 10. When the wearable device 20 has a plurality of UIMs, the corresponding authentication information can be specified on the basis of the UIM information to be transmitted to the coin-operated locker 10. The authentication information calculating unit 24 encrypts the authentication information using the authentication information (the authentication information for the wearable device) held in the authentication information holding unit 23 and the random number received by the short-range wireless communication unit 21.

After the short-range wireless communication unit 21 receives the random number for encryption, the authentication information calculating unit 24 performs a known calculation method using the random number for encryption and encrypts the authentication information held in the authentication information holding unit 23. The authentication information calculating unit 24 may be embodied by a Java (registered trademark) applet. The authentication information encrypted by the authentication information calculating unit 24 is transmitted from the short-range wireless communication unit 21 to the short-range wireless communication unit 11. The wearable device 20 may have a plurality of UIMs. In this case, the UIM used of which the UIM information is transmitted to the mobile device 40 and the UIM of which the UIM information is transmitted to the coin-operated locker 10 may be separated in advance.

Subsequently, the authentication server 30 will be described. The authentication server 30 includes a communication unit 31, an authentication-relevant information holding unit 32, a base station information holding unit 33, a comparison unit 34 (comparison means), and an authentication information calculating unit 35.

The communication unit 31 is a part that communicates with the coin-operated locker 10 or the mobile device 40 via the mobile communication based on the coin-operated locker 10 or the mobile device 40. The communication unit 31 receives the UIM information of a communication partner (for example, the coin-operated locker 10 or the mobile device 40), the identification information of the communication partner (for example, a coin-operated locker ID or information for identifying the mobile device 40), and the base station ID at the time of communication (for example, at the timing at which the UIM information is received from the communication partner). The UIM information of the communication partner, the identification information of the communication partner, and the base station ID which are received by the communication unit 31 are held in the base station information holding unit 33 to be described later in correlation with each other.

After connection to the coin-operated locker 10 (after it is changed to a state in which it can perform the mobile communication with the coin-operated locker 10), the communication unit 31 receives the coin-operated locker ID and information indicating the locking state from the coin-operated locker 10. When the coin-operated locker 10 is locked (for example, when the authentication-relevant information including the coin-operated locker ID and the UIM information from the coin-operated locker 10 corresponding to the coin-operated locker ID is not held in the authentication-relevant information holding unit 32 to be described later), the authentication information (the authentication information for the authentication server) generated by the coin-operated locker 10 is received in an encrypted state from the coin-operated locker 10. The communication unit 31 holds the device identification information, the locking state, the encrypted authentication information for the authentication server, the UIM information (the UIM information when the device identification information or the like is received) as the authentication-relevant information in the authentication-relevant information holding unit 32 in correlation with each other.

The communication unit 31 receives the random number for encrypting the authentication information along with the authentication information transmission request from the server communication unit 12 in order for the coin-operated locker 10 to perform an unlocking process. In this case, the communication unit 31 transmits the encrypted random number to the authentication information calculating unit 35 to be described later. The authentication information calculating unit 35 to be described later encrypts the authentication information held in the authentication-relevant information holding unit 32 using the random number. Then, the communication unit 31 transmits the authentication information (the authentication information for the authentication server) encrypted by the authentication information calculating unit 35 to the coin-operated locker 10.

When the locking or unlocking is confirmed by a user using the confirmation application of the mobile device 40 at the time of communication with the mobile device 40, the communication unit 31 receives a confirmation message and the coin-operated locker ID from the server communication unit 42.

When the confirmation message is received, the communication unit 31 notifies the server communication unit 42 of a cutting instruction. When the UIM information correlated with the same coin-operated locker ID as the received coin-operated locker ID in the information held in the authentication-relevant information holding unit 32 is coincident with the UIM information appropriately received from the server communication unit 42, the communication unit 31 may notify the server communication unit 42 of the cutting instruction. In this case, this is because the coin-operated locker 10 needs to communicate with the authentication server 30 by the mobile communication using the UIM information received from the server communication unit 42.

The authentication-relevant information holding unit 32 is a part that holds the coin-operated locker ID, the locking state, the encrypted authentication information, and the UIM information which are received by the communication unit 31 as described above as the authentication-relevant information in correlation with each other. The authentication information held in the authentication-relevant information holding unit 32 is further encrypted by the authentication information calculating unit 35.

The base station information holding unit 33 holds the UIM information of the communication partner, the identification information of the communication partner, and the base station ID which are received by the communication unit 31 as described above in correlation with each other. The base station information holding unit 33 also holds the holding date and time (time) in correlation therewith. The base station information held in the base station information holding unit 33 is compared between the base stations of a plurality of communications by the comparison unit 34 to be described later.

The comparison unit 34 compares the base station (for example, the base station in the immediately previous mobile communication) when the mobile communication is performed to communicate with the authentication server 30 in authenticating the coin-operated locker 10 and the base station in the immediately previous connection (for example, the immediately previous connection of the mobile device 40 to the authentication server 30 using the same UIM) with reference to the information held in the base station information holding unit 33 base station information holding unit 33. For example, when position-registered areas to which the base stations belong are different as the comparison result, an error message as the comparison result is transmitted to the coin-operated locker 10 via the communication unit 31. In this way, the comparison unit 34 compares the base station of the coin-operated locker 10 (information indicating the position thereof) at the timing of communication with the authentication server 30 by the mobile communication using the UIM information which is performed by the coin-operated locker 10 and the base station of the device performing the mobile communication when the mobile communication is performed using UIM information corresponding to the UIM information. In addition to comparison of the communications using the same UIM, when the same wearable device 20 or the same mobile device 40 have a plurality of UIMs, the UIMs may be correlated and the base stations used for the communications using the UIMs may be compared. Even when the wearable device 20 and the mobile device 40 have UIMs, respectively, the UIMs may be correlated and the base stations used for the communications using the UIMs may be compared.

The authentication information calculating unit 35 encrypts the authentication information (the authentication information for the authentication server) held in the authentication-relevant information holding unit 32 using the encrypted random number received from the coin-operated locker 10 at the time of locking the coin-operated locker 10. The authentication information calculating unit 35 may be embodied by a Java (registered trademark) applet. The authentication information calculating unit 35 sends out the encrypted authentication information to the communication unit 31.

Subsequently, the mobile device 40 will be described. The mobile device 40 includes a short-range wireless communication unit 41, a server communication unit 42, and a locking control confirming unit 43.

The short-range wireless communication unit 41 is a part that performs the short-range wireless communication by the BLE connection or the NFC connection to the wearable device 20. That is, the short-range wireless communication unit 41 performs short-range wireless communication with the wearable device 20.

When the wearable device 20 is located within the communication coverage (when a user approaches the wearable device 20), the short-range wireless communication unit 41 performs short-range wireless communication with the wearable device 20.

When the mobile device 40 does not have a UIM, the short-range wireless communication unit 41 receives the UIM information from the wearable device 20. The server communication unit 42 communicates with the authentication server 30 using the UIM information received by the short-range wireless communication unit 41.

The short-range wireless communication unit 41 receives a start request of the confirmation application from the short-range wireless communication unit 21 or receives a device information reception message to the coin-operated locker 10 from the short-range wireless communication unit 21. Accordingly, the short-range wireless communication unit 41 notifies the locking control confirming unit 43 of the start request. Details after the confirmation application is started will be described later along with the locking control confirming unit 43.

When the server communication unit 42 receives a cutting request from the authentication server 30 after the authentication server 30 is notified by the server communication unit 42 on the basis of the operation of the locking control confirming unit 43, the short-range wireless communication unit 41 cuts off the short-range wireless communication with the wearable device 20.

The server communication unit 42 is a part that communicates with the authentication server 30 via a mobile communication network. When the mobile device 40 does not have a UIM, the server communication unit 42 receives UIM information from the wearable device 20 via the short-range wireless communication unit 41 and communicates with the authentication server 30 via the mobile communication network using the UIM information. When the mobile device 40 has a UIM, the server communication unit 42 communicates with the authentication server 30 using the UIM information held in the UIM of the mobile device 40.

Similarly to the server communication unit 12 of the coin-operated locker 10, the server communication unit 42 communicates with the authentication server 30 via a predetermined base station at the time of communication with the authentication server 30. Accordingly, the server communication unit 42 transmits the UIM information and information (such as an ID of the mobile device 40) for identifying the mobile device 40 to the base station. The base station transmits the UIM information, the ID of the mobile device 40, and the base station ID to the authentication server 30.

When the locking control confirming unit 43 to be described later that the locking control is performed, the server communication unit 42 notifies the authentication server 30 that the user has an intention to control the locking. In this case, when the mobile device 40 does not have a UIM, the server communication unit 42 receives an instruction to cut off the BLE connection to the wearable device 20 from the authentication server 30 and transmits the cutting instruction to the short-range wireless communication unit 41.

The locking control confirming unit 43 is a part that causes a user to confirm the locking control. Specifically, the locking control confirming unit is embodied by the above-mentioned confirmation application. At the timing at which a message indicating that the wearable device 20 receives the device information from the coin-operated locker 10 by the NFC connection is received from the wearable device 20 or at the timing at which the wearable device 20 transmits a confirmation application start request to the mobile device 40, the confirmation application is started.

The confirmation application receives whether to permit the locking or unlocking of the coin-operated locker 10. The confirmation application receives whether to permit the locking or unlocking of the coin-operated locker 10 by outputting a message such as "IS LOCKING OF COIN-OPERATED LOCKER PERFORMED?" to a display (output device) of the mobile device 40 and outputting a confirmation button. When the locking control is confirmed by the user's operation of the confirmation application (the confirmation button is pressed in the above-mentioned example), the locking control confirming unit 43 notifies the authentication server 30 via the server communication unit 42 accordingly.

In this way, by causing the locking control confirming unit 43 to confirm the locking control, it is possible to confirm a user's intention. It is possible to prevent the coin-operated locker 10 from being unlocked without permission by only allowing the wearable device 20 to approach the coin-operated locker 10 even when the user has no intention to unlock the coin-operated locker 10. Since the cutting instruction to cut off the short-range wireless communication with the wearable device 20 is received from the authentication server 30 after the locking control confirming unit 43 conforms the locking control, it is possible to prevent the short-range wireless communication with the wearable device 20 from being cut off even when the user has no intention to unlock the coin-operated locker 10.

(Description of Hardware Configuration)

Figure 3:
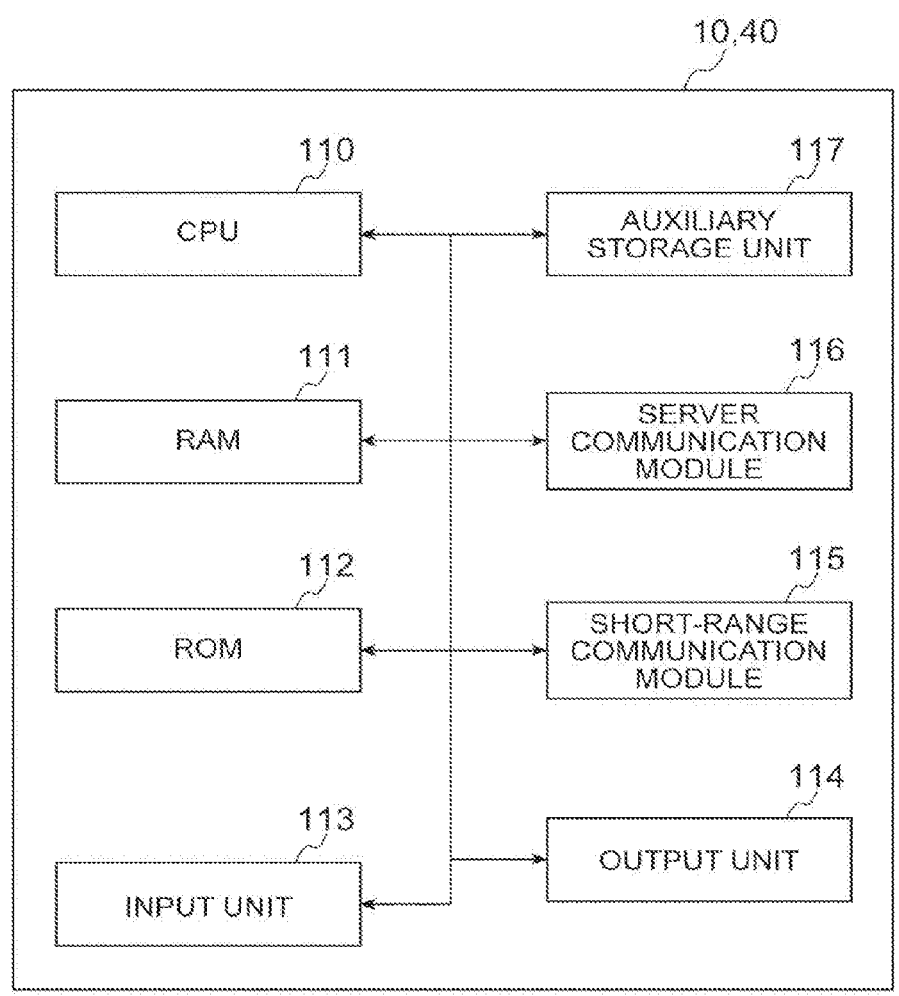
FIG. 3 is a diagram illustrating a hardware configuration of a mobile device 40 and a coin-operated locker 10.

The hardware configurations of the coin-operated locker 10 and the mobile device 40 will be described below. As illustrated in FIG. 3, the coin-operated locker 10 and the mobile device 40 are constituted as a computer system including one or more CPUs 110, a RAM 111 and a ROM 112 which are main memories, an input unit 113 such as an input device (for example, keys on a touch panel), an output unit 114 such as a display, a short-range wireless communication module 115 which is a communication module for short-range wireless communication such as the NFC or the BLE, a server communication module 116 which is a module for communication with the authentication server 30 and which is a data transmitting and receiving device such as a network card, and an auxiliary storage unit 117 such as a semiconductor memory. The mobile device 40 and the coin-operated locker 10 are realized by reading predetermined computer software onto hardware such as the CPU 110 and the RAM 111 illustrated in FIG. 3 to operate the input unit 113, the output unit 114, the short-range wireless communication module 115, and the short-range wireless communication module 115 under the control of the CPU 110 and reading and writing data with respect to the RAM 111 or the auxiliary storage unit 117.

Figure 4:
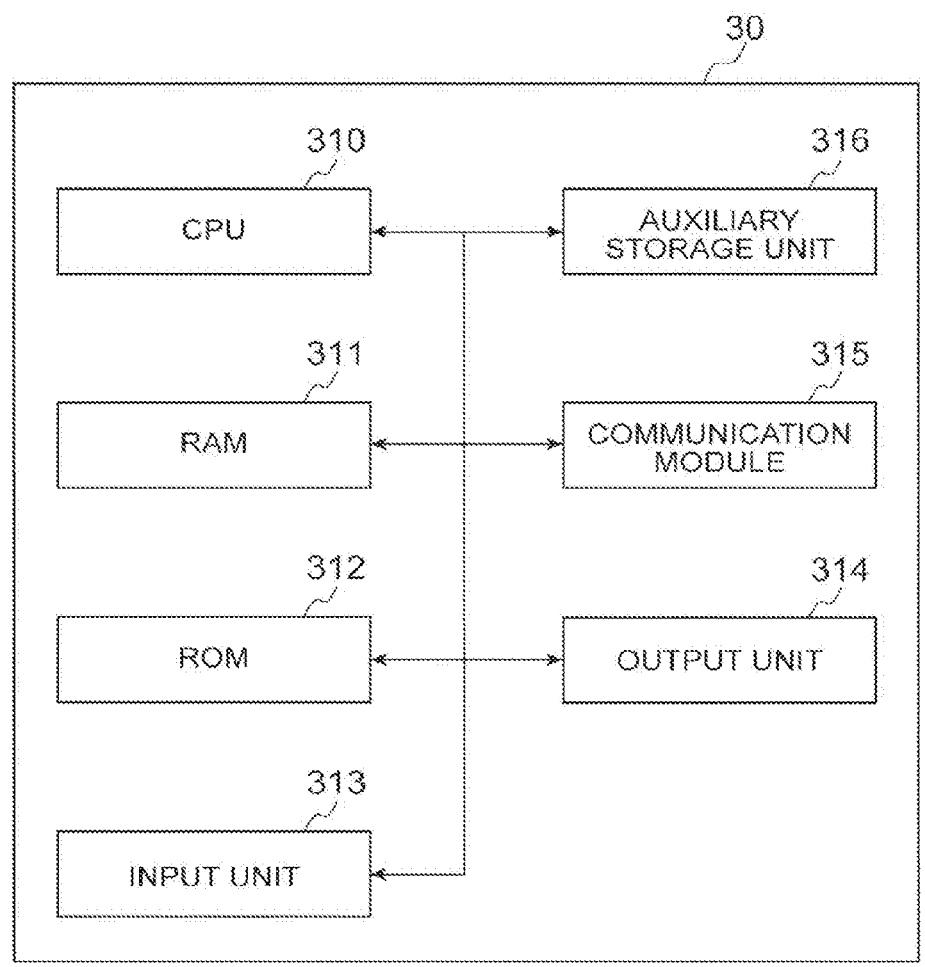
FIG. 4 is a diagram illustrating a hardware configuration of a server 30.

Subsequently, the hardware configuration of the authentication server 30 will be described. As illustrated in FIG. 4, the authentication server 30 is constituted by a computer system including one or more CPUs 310, a RAM 311 and a ROM 312 which are main memories, an input unit 313 such as a keyboard and a mouse which is an input device, an output unit 314 such as a display, a communication module 315 which is a data transmitting and receiving device such as a network card, and an auxiliary storage unit 317 such as a semiconductor memory. The authentication server 30 and the coin-operated locker 10 are realized by reading predetermined computer software onto hardware such as the CPU 310 and the RAM 311 illustrated in FIG. 4 to operate the input unit 313, the output unit 314, and the communication module 315 under the control of the CPU 310 and reading and writing data with respect to the RAM 311 or the auxiliary storage unit 316.

Figure 5:
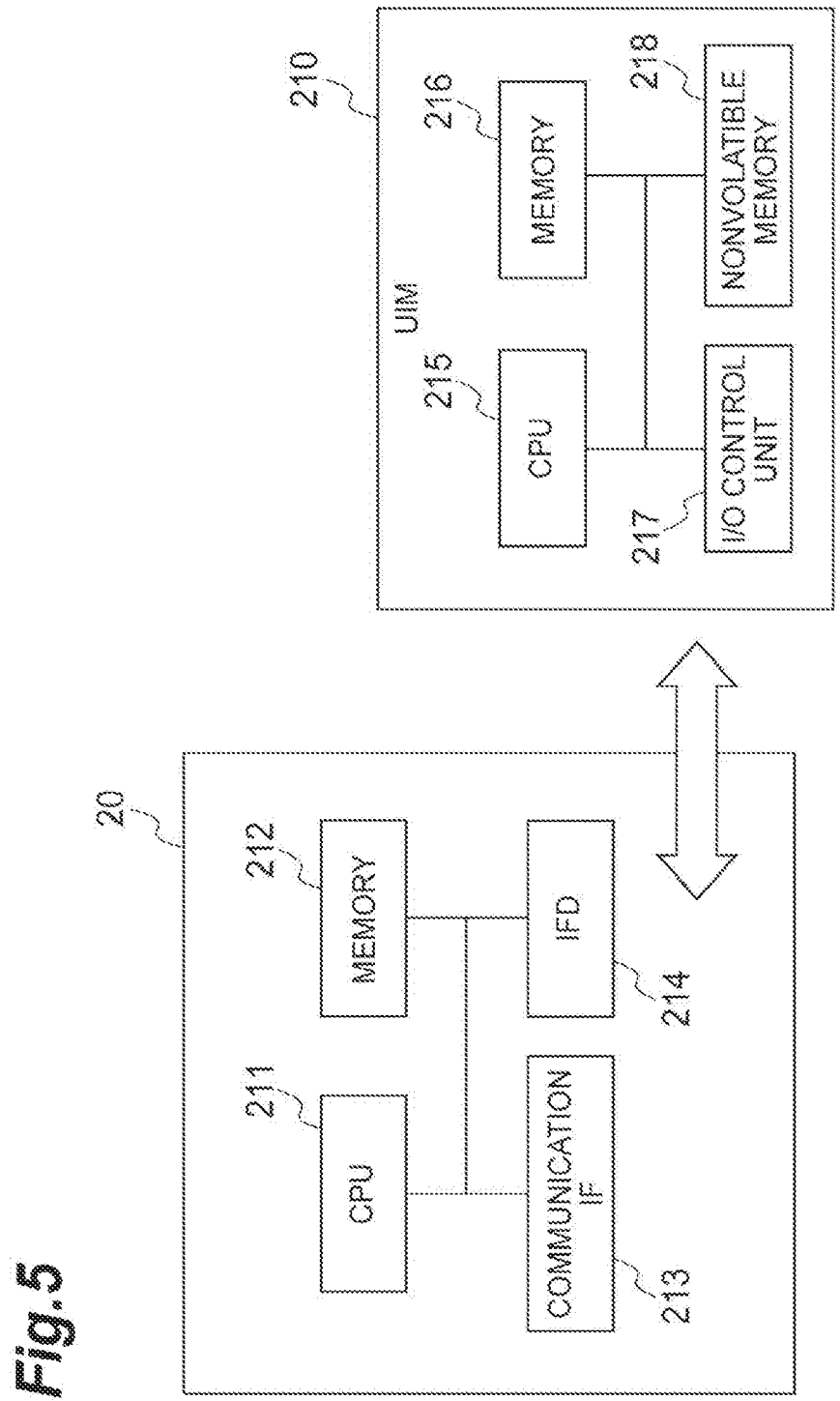
FIG. 5 is a diagram illustrating a hardware configuration of a wearable device 20.

Subsequently, the hardware configuration of the wearable device 20 will be described. As illustrated in FIG. 5, the wearable device 20 physically includes, for example, a CPU 211, a memory 212 such as a ROM or a RAM, a communication interface (IF) 213 for communication with the outside, and an interface device (IFD) 214 for exchanging data with a UIM 210.

The UIM 210 physically includes, for example, a CPU 215, a memory 216 such as a ROM or a RAM, a nonvolatile memory 218 such as an EEPROM, and an I/O control, unit 217 that controls exchange of data with the wearable device 20.

Subsequently, processes and operations which are performed by the locking control system 1 according to this embodiment will be described with reference to the sequence diagram illustrated in FIG. 6. In the sequence diagram illustrated in FIG. 6, when the wearable device 20 has one UIM, the coin-operated locker 10 receives information of the UIM by performing short-range wireless communication with the wearable device 20, and performs mobile communication with the authentication server 30 using the UIM information. The authentication information generated by the coin-operated locker 10 is transmitted to the authentication server 30 and the wearable device 20 to control the locking or unlocking of the coin-operated locker 10. It is assumed that the wearable device 20 has one UIM and the mobile device 40 has no UIM.

The locking process of the coin-operated locker 10 will be first described and then the unlocking process will be described. First, a user causes the wearable device 20 to approach the coin-operated locker 10 (step S1). At the time at which the user causes the wearable device 20 to approach the coin-operated locker 10, it is assumed that the user puts baggage into the coin-operated locker 10 and closes the door of the coin-operated locker 10. That is, it is assumed that locking is ready.

As the result of step S1, the short-range wireless communication unit 11 of the coin-operated locker 10 and the short-range wireless communication unit 21 of the wearable device 20 are connected by the NFC (that is, linked state) (step S2). The short-range wireless communication unit 11 of the wearable device 20 transmits device type information of the coin-operated locker 10 to the wearable device 20 and the short-range wireless communication unit 21 receives the device type information (step S3).

The short-range wireless communication unit 21 of the wearable device 20 confirms that the coin-operated locker is a BLE connection target, and the short-range wireless communication unit 11 of the coin-operated locker 10, and the short-range wireless communication unit 21 of the wearable device 20 are BLE-connected to each other (step S4). When the coin-operated locker 10 and the wearable device 20 are BLE-connected, the short-range wireless communication unit 21 of the wearable device 20 periodically transmits UIM information to the short-range wireless communication unit 11 of the coin-operated locker 10 and the short-range wireless communication unit 11 receives the UIM information.

The server communication unit 12 of the coin-operated locker 10 accesses the authentication server 30 by the mobile communication using the UIM information received by the short-range wireless communication unit 11 (step S5). The server communication unit 12 accesses the authentication server 30 and then transmits device information to the authentication server 30, and the communication unit 31 receives the device information (step S6).

Thereafter, the authentication information generating unit 13 of the coin-operated locker 10 generates authentication information and divides the authentication information into the authentication information for the authentication server 30 and the authentication information for the wearable device 20. The authentication information generated by the authentication information generating unit 13 is held in the authentication information holding unit 14 (step S7).

When the authentication information is generated by the authentication information generating unit 13, the locking control unit 16 locks the door of the coin-operated locker 10 (step S8). Then, the server communication unit 12 transmits the authentication information for the authentication server to the authentication server 30 and the communication unit 31 receives the authentication information (step S9). Then, the short-range wireless communication unit 11 transmits the authentication information for the wearable device 20 to the wearable device 20 and the short-range wireless communication unit 21 receives the authentication information (step S10).

After the authentication information is transmitted to the wearable device 20 and the authentication server 30, the coin-operated locker 10 cuts off the BLE connection between the short-range wireless communication unit 11 of the coin-operated locker 10 and the short-range wireless communication unit 21 of the wearable device 20 (step S11).

Thereafter, the short-range wireless communication unit 21 of the wearable device 20 and the short-range wireless communication unit 41 of the mobile device 40 are BLE-connected (step S12), and the short-range wireless communication unit 41 receives the UIM information from the wearable device 20 and is connected to the authentication server 30 using the UIM information (step S13).

When the user holds the wearable device 20 up to the locked coin-operated locker 10 for the purpose of unlocking the coin-operated locker (step S14), the short-range wireless communication unit 11 of the coin-operated locker 10 and the short-range wireless communication unit 21 of the wearable device 20 are NFC-connected to each other (step S15).

When the NFC connection is attained, the short-range wireless communication unit 11 of the coin-operated locker 10 transmits the device information to the wearable device 20, and the short-range wireless communication unit 21 receives the device information (step S16).

Then, the short-range wireless communication unit 21 determines that the coin-operated locker 10 is a device to be BLE-connected on the basis of the device information received from the coin-operated locker 10. Then, the short-range wireless communication unit 21 cuts off the BLE connection to the short-range wireless communication unit 41 (step S17). As a result, the server communication unit 42 of the mobile device 40 cannot receive the UIM information from the wearable device 20 and thus cuts of the communication with the authentication server 30 (step S18).

The short-range wireless communication unit 21 is BLE-connected to the short-range wireless communication unit 11 and thus the short-range wireless communication unit 21 transmits the UIM information to the coin-operated locker 10, thus the short-range wireless communication unit 11 receives the UIM information (step S19: communication information transmitting step, communication information receiving step). The short-range wireless communication unit 11 transmits a random number to the wearable device 20. The server communication unit 12 is connected to the authentication server 30 using the UIM information received by the short-range wireless communication unit 21 (step S20). When the coin-operated locker 10 and the authentication server 30 are connected to each other, the server communication unit 12 transmits device information to the authentication server 30 (step S21). The server communication unit 12 transmits a random number generated for encryption by the coin-operated locker 10 to the authentication server 30 at the timing at which the device information is transmitted to the authentication server 30, and the communication unit 31 receives the random number.

The authentication server 30 retrieves the authentication information corresponding to the UIM information used for the mobile communication and the device information received from the coin-operated locker 10 from the authentication-relevant information holding unit 32. The authentication information calculating unit 35 encrypts the authentication information using the random number received from the coin-operated locker 10. Then, the communication unit 31 transmits the encrypted authentication information to the coin-operated locker 10. The server communication unit 12 receives the authentication information from the authentication server 30 (step S22, authentication information receiving step). When the comparison result of the base stations by the comparison unit 34 indicates an error, an error message is transmitted to the coin-operated locker 10 via the communication unit 31. In this case, the server communication unit 12 receives the error message.

The wearable device 20 encrypts the authentication information using the random number received from the coin-operated locker 10 and transmits the authentication information to the coin-operated locker 10, and the short-range wireless communication unit 11 receives the authentication information (step S23).

The authentication unit 15 decrypts the authentication information received from the authentication server 30 and the authentication information received from the wearable device 20 using the generated random number, compares a combination of the decrypted authentication information and the authentication information held in the authentication information holding unit 14, and determines that the authentication succeeds when the combination and the authentication information are coincident with each other (step S24, authentication step). When the authentication fails (when the combination and the authentication information are not coincident with each other or when the error message is received from the authentication server 30), the process end without unlocking the coin-operated locker 10.

When it is determined in step S24 that the authentication succeeds, the locking control unit 16 unlocks the coin-operated locker 10 and ends the process (step S25, locking control step).

Subsequently, processes and operations which are performed by the locking control system 1 according to this embodiment will be described with reference to the sequence diagram illustrated in FIG. 7. In the sequence diagram illustrated in FIG. 7, in a state in which the coin-operated locker 10 is already locked (the state in which step S11 ends in FIG. 6), it is confirmed whether to lock or unlock the coin-operated locker using the confirmation application of the mobile device 40 in response to the unlocking request from the user, and then the coin-operated locker 10 is unlocked after the confirmation. It is assumed that the wearable device 20 has one UIM. The mobile device 40 has no UIM.

After the locking, the short-range wireless communication unit 21 of the wearable device 20 and the short-range wireless communication unit 41 of the mobile device 40 are BLE-connected to each other (step S31). Accordingly, UIM information is transmitted from the short-range wireless communication unit 21 to the short-range wireless communication unit 41. Then, the mobile device 40 accesses the authentication server 30 using the UIM information (step S32).

Thereafter, when the user holds the wearable device 20 up to the locked coin-operated locker 10 (step S33), the short-range wireless communication unit 11 of the coin-operated locker 10 and the short-range wireless communication unit 21 of the wearable device 20 are NFC-connected to each other (step S34).

When the NFC connection is attained, the short-range wireless communication unit 11 of the coin-operated locker 10 transmits the device information to the wearable device 20 (step S35).

The short-range wireless communication unit 21 notifies the short-range wireless communication unit 41 of the device information (step S36), and the confirmation application is started while communication with the authentication server 30 via the server communication unit 42 continues (step S37).

When the button of unlocking confirmation is pressed by the user, a message indicating the pressing is transmitted to the authentication server 30 by the server communication unit 42 (step S38). When the message is received, the communication unit 31 transmits a cutting instruction to the server communication unit 42 of the mobile device 40 (step S39).

The mobile device 40 cuts off the BLE connection to the wearable device 20 (step S40) and thus the connection between the mobile device 40 and the authentication server 30 is also cut off (step S41).

The short-range wireless communication unit 21 of the wearable device 20 is BLE-connected to the short-range wireless communication unit 11 of the coin-operated locker 10 after the BLE connection to the short-range wireless communication unit 41 is cut off (step S42). The processes of step S43 and steps subsequent thereto are the same as the processes of step S20 and steps subsequent thereto illustrated in FIG. 5 and thus will be omitted.

Subsequently, processes and operations which are performed by the locking control system 1 according to this embodiment will be described with reference to the sequence diagram illustrated in FIG. 8. In the sequence diagram illustrated in FIG. 8, in a state in which the coin-operated locker 10 is already locked (the state in which step S11 ends in FIG. 6), the coin-operated locker 10 is unlocked in response to the unlocking request from the user. The wearable device 20 holds a plurality of UIMs, specifically, has a UIM holding UIM information for mobile communication of the mobile device 40 with the authentication server 30 and a UIM which is used for communication with an external device such as the coin-operated locker 10. It is assumed that setting information on whether a UIM is used for communication with the mobile device 40 is held in the wearable device 20 in advance. It is assumed that the mobile device 40 has no UIM.

After the locking, the short-range wireless communication unit of the wearable device 20 and the short-range wireless communication unit 41 of the mobile device 40 are BLE-connected to each other (step S51). Accordingly, UIM information is transmitted from the short-range wireless communication unit 21 to the short-range wireless communication unit 41. Then, the mobile device 40 accesses the authentication server 30 using the UIM information (step S52).

Thereafter, when the user holds the wearable device 20 up to the locked coin-operated locker 10 (step S53), the short-range wireless communication unit 11 of the coin-operated locker 10 and the short-range wireless communication unit 21 of the wearable device 20 are NFC-connected to each other (step S54).

When the NFC connection is attained, the short-range wireless communication unit 11 of the coin-operated locker 10 transmits the device information to the wearable device 20 (step S55). The short-range wireless communication unit 21 confirms that the coin-operated locker is to be BLE-connected from the device information and is BLE-connected to the short-range wireless communication unit 11 (step S56).

Figure 6:
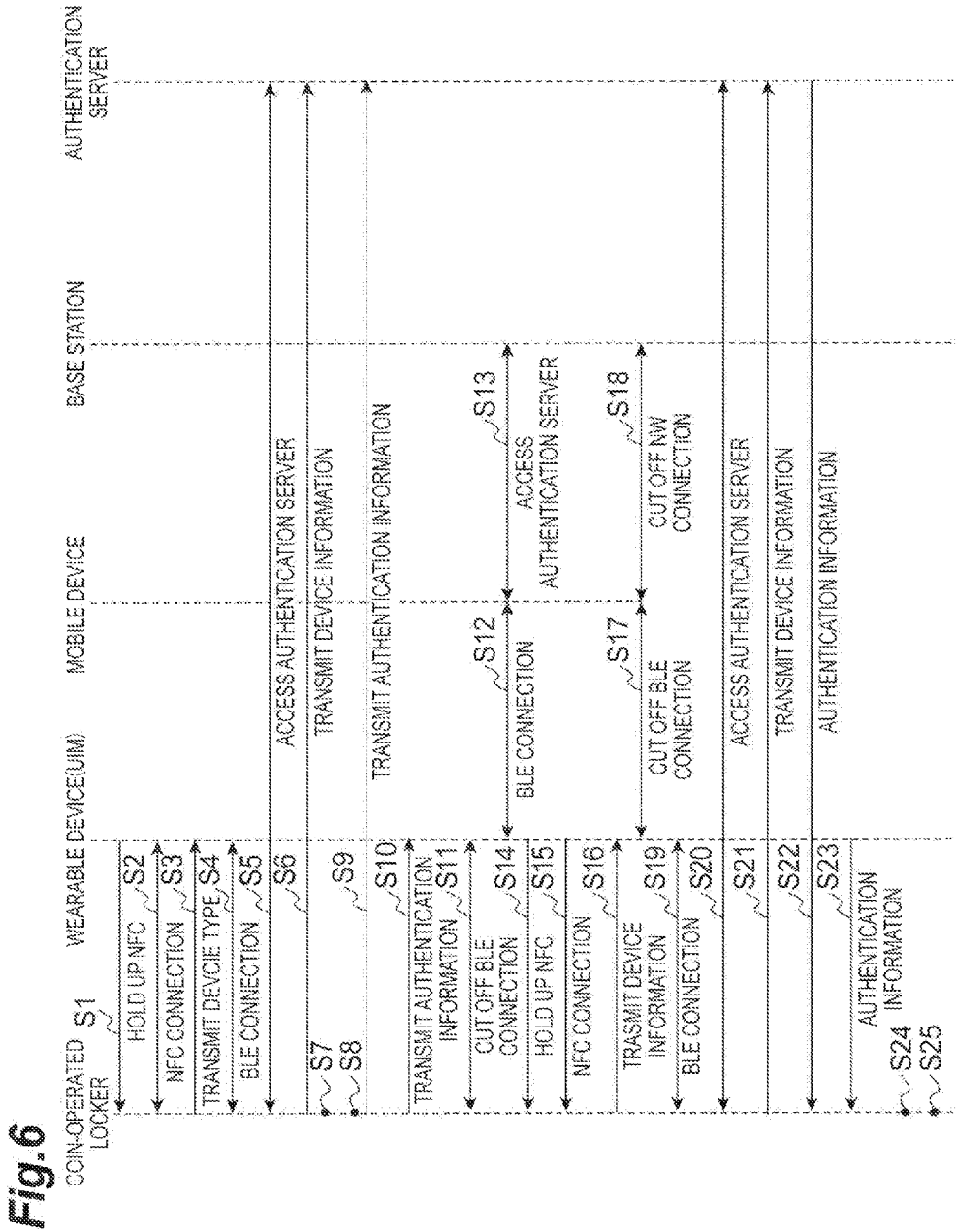
FIG. 6 is a sequence diagram (1) of processes which are performed by the locking system.

The processes of step S57 and steps subsequent thereto are the same as the processes of step S20 and steps subsequent thereto illustrated in FIG. 6 and thus will be omitted.

Subsequently, processes and operations which are performed by the locking control system 1 according to this embodiment will be described with reference to the sequence diagram illustrated in FIG. 9. In the sequence diagram illustrated in FIG. 9, in a state in which the coin-operated locker 10 is already locked (the state in which step S11 ends in FIG. 6), it is confirmed whether to lock or unlock the coin-operated locker using the confirmation application of the mobile device 40 in response to the unlocking request from the user, and then the coin-operated locker 10 is unlocked after the confirmation. It is assumed that the mobile device 40 has a UIM. That is, the mobile device can independently perform mobile communication without receiving the UIM information from the wearable device 20.

After the locking, the mobile device 40 accesses the authentication server 30 using the UIM information of the mobile device 40 (step S71).

Thereafter, when the user holds the wearable device 20 up to the locked coin-operated locker 10 (step S72), the short-range wireless communication unit 11 of the coin-operated locker 10 and the short-range wireless communication unit 21 of the wearable device 20 are NFC-connected to each other (step S73).

When the NFC connection is attained, the short-range wireless communication unit 11 of the coin-operated locker 10 transmits the device information to the wearable device 20 (step S74).

The short-range wireless communication unit 21 is BLE-connected to the short-range wireless communication unit 41 and transmits the confirmation application start request to the mobile device 40 (step S75). Accordingly, the confirmation application is started while communication with the authentication server 30 via the server communication unit 42 continues (step S76).

When the button of unlocking confirmation is pressed by the user, a message indicating the pressing is transmitted to the authentication server 30 by the server communication unit 42 (step S77). When the message is received, the communication unit 31 transmits a cutting instruction to the server communication unit 42 of the mobile device 40 (step S78).

The mobile device 40 cuts off the BLE connection to the wearable device 20 (step S79).

The short-range wireless communication unit 21 of the wearable device 20 is BLE-connected to the short-range wireless communication unit 11 of the coin-operated locker 10 after the BLE connection to the short-range wireless communication unit 41 is cut off (step S80). The processes of step S81 and steps subsequent thereto are the same as the processes of step S20 and steps subsequent thereto illustrated in FIG. 5 and thus will be omitted.

In the above-mentioned embodiment, the coin-operated locker 10 and the authentication server 30 perform the mobile communication with each other, but may perform communication using a wireless LAN (for example, Wifi).

Both may perform communication of accessing the mobile communication network via the wireless LAN. When communication is performed using the wireless LAN, a wireless LAN access point is used. The wireless LAN access point may be provided by a communication common carrier of the mobile communication network.

In the above-mentioned embodiment, the coin-operated locker 10 transmits the authentication information to both the authentication server 30 and the wearable device 20, but may transmit the authentication information to only the authentication server 30. In this case, the authentication information held in the authentication server 30 is the same as the authentication information held in the coin-operated locker 10.

Information which is used for line authentication such as a telephone number may be used as the UIM information.

In the above-mentioned embodiment, the coin-operated locker 10 generates the authentication information, but the coin-operated locker 10 may generate authentication information corresponding to a user's input operation (for example, an operation on an input unit of the coin-operated locker 10). In this case, the authentication information may be generated on the basis of an input user ID/password. Signature information based on input information may be generated as the authentication information.

In the above-mentioned embodiment, the coin-operated locker is applied as the locking control device, but the present invention may be applied to another device requiring locking (for example, a safe or a automobile).

In the above-mentioned embodiment, the comparison unit 34 compares the base stations in two mobile communications, but position-registered information (position-registered area) in two mobile communications may be compared.

In the above-mentioned embodiment, the comparison unit 34 of the authentication server 30 compares the base stations in two mobile communications, but the coin-operated locker 10 may perform the comparison. For example, information of the base station information holding unit 33 of the authentication server 30 is transmitted to the coin-operated locker 10 and the base stations in two mobile communications are compared using the information of the base station information holding unit 33 received by the coin-operated locker 10.

In the above-mentioned embodiment, the authentication unit 15 performs the authentication only at the time of unlocking, but may also perform the authentication at the time of locking. The authentication information generating unit 13 generates the authentication information at the time of locking, but may generate the authentication information at the time unlocking.

In the above-mentioned embodiment, the coin-operated locker 10 generates the authentication information at the time of locking and performs the authentication using the authentication information at the time of unlocking, but may generate the authentication information at the first time of locking or unlocking and may repeatedly perform the authentication using the authentication information at the subsequent times of locking or unlocking. The process of generating the authentication information may be performed before the locking or unlocking control is performed. At the subsequent times of locking or unlocking, the authentication may be repeatedly performed using the authentication information.

(Operations and Effects)

Operations and effects will be described below. In the coin-operated locker 10, the short-range wireless communication unit 11 receives the UIM information, which is information for connection to the mobile communication network, from the wearable device 20 by the short-range wireless communication. The server communication unit 12 communicates with the authentication server 30 that holds the authentication-relevant information by the mobile communication using the UIM information. The server communication unit 12 receives the authentication information from the authentication server 30. The authentication unit 15 performs authentication using the authentication information received from the authentication server 30, and the locking control unit 16 performs the locking control on the basis of the authentication result from the authentication unit 15.

As described above, since the coin-operated locker 10 communicates with the authentication server 30 by the mobile communication using the UIM information, it is not necessary to make a line contract for the mobile communication network in the coin-operated locker 10 and it is possible to reduce a maintenance cost. Since the authentication is performed using the authentication information received from the authentication server 30, it is possible to maintain a high security level in the locking control. The UIM information is information which can be reissued. For example, when the UIM is lost, it is possible to use the line authentication and the authentication information by reissuing the UIM. When the lost UIM is used by a third party, the mobile communication may be disabled (for example, a Java (registered trademark) applet or UIM information in the UIM is invalidated by remotely invalidating the UIM or the like) at the timing at which the mobile communication (cellular communication) is requested. That is, it is possible to securely perform the locking control, to reissue the UIM even when the UIM is lost, and to reduce a maintenance cost.

According to the coin-operated locker 10, the UIM information is received when a user causes the wearable device 20 to approach the coin-operated locker 10. Accordingly, when the user has an intention to lock or unlock the coin-operated locker 10, the coin-operated locker 10 can communicate with the authentication server 30.

According to the coin-operated locker 10, since the authentication information is received from both the authentication server 30 and the wearable device 20 and the authentication is performed on the basis of the authentication information received from both, it is possible to perform securer authentication in comparison with a case in which the authentication is performed using authentication information received from a single device.

According to the coin-operated locker 10, it is possible to perform authentication using the authentication information generated by the coin-operated locker 10. Accordingly, it is possible to generate authentication information without receiving an input of authentication information from a user.

REFERENCE SIGNS LIST

1 . . . locking control system, 10 . . . coin-operated locker, 11 . . . short-range wireless communication unit, 12 . . . server communication unit, 13 . . . authentication information generating unit, 14 . . . authentication information holding unit, 15 . . . authentication unit, 16 . . . locking control unit, 20 . . . wearable device, 21 . . . short-range wireless communication unit, 22 . . . UIM information holding unit, 23 . . . authentication information holding unit, 24 . . . authentication information calculating unit, 30 . . . authentication server, 31 . . . communication unit, 32 . . .

authentication-relevant information holding unit, 33 . . . base station information holding unit, 34 . . . comparison unit, 35 . . . authentication information calculating unit, 40 . . . mobile device, 41 . . . short-range wireless communication unit, 42 . . . server communication unit, 43 . . . locking control confirming unit

The invention claimed is:

1. A locking control device that performs locking or unlocking, comprising a circuitry configured to:
   receive communication information, which is information for connection to a mobile communication network, from a communication device by communication other than mobile communication;
   communicate with an authentication server, which holds authentication information which is information for authenticating the locking or unlocking, by mobile communication using the communication information received and receive authentication information corresponding to the communication information from the authentication server;
   authenticate the locking or unlocking using the authentication information received; and
   perform the locking or unlocking when the authentication succeeds.

2. The locking control device according to claim 1, wherein the locking control device receives the communication information by short-range wireless communication.

3. The locking control device according to claim 1, wherein the locking control device receives communication-device authentication information which is authentication information held by the communication device from the communication device, and
   wherein the locking control device authenticates additionally using the communication-device authentication information received.

4. The locking control device according to claim 1, wherein the locking control device:
   generates the authentication information; and
   wherein the locking control device transmits the authentication information generated to the authentication server by mobile communication using the communication information received, and
   wherein the locking control device receives the authentication information transmitted from the authentication server.

5. A locking control system comprising a communication device that communicates with a locking control device that performs locking or unlocking,
   wherein the locking control device includes a circuitry configured to:
   receive communication information, which is information for connection to a mobile communication network, from the communication device by communication other than mobile communication;
   communicate with an authentication server, which holds authentication information which is information for authenticating the locking or unlocking, by mobile communication using the communication information received and receive the authentication information corresponding to the communication information from the authentication server;
   authenticate the locking or unlocking using the authentication information received; and
   perform the locking or unlocking when the authentication succeeds, and
   the communication device includes circuitry configured to:
   hold the communication information; and
   communicate with the locking control device by the communication other than the mobile communication, and transmitting the communication information to the locking control device by the communication, as triggered by performing the communication with the locking control device.

6. The locking control system according to claim 5, wherein the locking control system compares a position of the locking control device at a timing of communication with the authentication server by the mobile communication using the communication information which is performed by the locking control device and a position of a device performing the mobile communication when the mobile communication using communication information corresponding to the communication information is performed and outputting a comparison result to the locking control device,
   wherein the locking control device receives the comparison result output, and
   wherein the locking control device performs authentication also on the basis of the comparison result received.

7. A locking control method which is performed by a locking control device that performs locking or unlocking, the locking control method comprising:
   a communication information receiving step of receiving communication information, which is information for connection to a mobile communication network, from a communication device by communication other than mobile communication;
   an authentication information receiving step of communicating with an authentication server, which holds authentication information which is information for authenticating the locking or unlocking, by mobile communication using the communication information received in the communication information receiving step and receiving authentication information corresponding to the communication information from the authentication server;
   an authentication step of authenticating the locking or unlocking using the authentication information received in the authentication information receiving step; and
   a locking control step of performing the locking or unlocking when the authentication in the authentication step succeeds.

8. A locking control method which is performed by a locking control system including a communication device that communicates with a locking control device that performs locking or unlocking,
   wherein the communication device holds communication information which is information for connection to a mobile communication network,
   the locking control device performs:
   a communication information receiving step of receiving the communication information from a communication device by communication other than mobile communication;
   an authentication information receiving step of communicating with an authentication server, which holds authentication information which is information for authenticating the locking or unlocking, by mobile communication using the communication information received in the communication information receiving step and receiving authentication information corresponding to the communication information from the authentication server;

an authentication step of authenticating the locking or unlocking using the authentication information received in the authentication information receiving step; and a locking control step of performing the locking or unlocking when the authentication in the authentication step succeeds, and the communication device performs a communication information transmitting step of communicating with the locking control device by the communication other than the mobile communication, and transmitting the communication information to the locking control device by the communication, as triggered by performing the communication with the locking control device.

\* \* \* \* \*